United States Patent
Choi

(10) Patent No.: US 12,524,162 B2
(45) Date of Patent: Jan. 13, 2026

(54) NONVOLATILE MEMORY DEVICE AND METHOD OF PROGRAMMING A NONVOLATILE MEMORY

(71) Applicant: SAMSUNG ELECTRONICS CO., LTD., Suwon-si (KR)

(72) Inventor: Yonghyuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 18/399,867

(22) Filed: Dec. 29, 2023

(65) Prior Publication Data

US 2024/0241649 A1    Jul. 18, 2024

(30) Foreign Application Priority Data

Jan. 12, 2023 (KR) .......... 10-2023-0004599
Mar. 21, 2023 (KR) .......... 10-2023-0036257

(51) Int. Cl.
*G11C 16/04* (2006.01)
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
See application file for complete search history.

(56) References Cited

U.S. PATENT DOCUMENTS

| | | | |
|---|---|---|---|
| 7,764,542 B2 | 7/2010 | Edahiro et al. | |
| 8,599,617 B2 * | 12/2013 | Shiino | G11C 16/344 365/185.17 |
| 8,654,587 B2 | 2/2014 | Yoon et al. | |
| 8,717,821 B2 * | 5/2014 | Jung | G11C 16/3454 365/211 |
| 9,478,304 B2 | 10/2016 | Park et al. | |
| 9,595,333 B2 | 3/2017 | Sim et al. | |
| 11,410,733 B2 | 8/2022 | Mun | |
| 2011/0069546 A1 | 3/2011 | Watanabe | |
| 2013/0208545 A1 | 8/2013 | Lee | |
| 2013/0242666 A1 * | 9/2013 | Izumi | G11C 16/10 365/185.19 |
| 2022/0076766 A1 | 3/2022 | Jang et al. | |

FOREIGN PATENT DOCUMENTS

KR    10-2011-0078733 A    7/2011

* cited by examiner

*Primary Examiner* — Pho M Luu
(74) *Attorney, Agent, or Firm* — MORGAN, LEWIS & BOCKIUS LLP

(57) ABSTRACT

A nonvolatile memory device includes a memory block and a control circuit. The memory block includes cell strings. The control circuit controls a first program operation by dividing program data having threshold voltage distributions which have a plurality of states into a plurality of groups, discharging target bit-lines coupled to selected cell strings corresponding to the groups to a ground voltage during a bit-line set-up period of a program loop, discriminating a set-up timing of each of the target bit-lines based on target states of the groups during a first sub period, in which a program voltage and a program pass voltage are ramping and applying the program voltage with a signal pulse having a second target level to a selected word-line, while applying the program pass voltage having a first target level to unselected word-lines, during a second sub period.

20 Claims, 32 Drawing Sheets

APPLY A POWER SUPPLY VOLTAGE AT A FIRST TIME POINT, TO AT LEAST ONE FIRST BIT-LINE COUPLED TO AT LEAST ONE FIRST CELL STRING CORRESPONDING TO A SECOND GROUP INCLUDING A LOWER STATE HAVING A LOWERMOST VOLTAGE DISTRIBUTION ADJACENT TO AN ERASED STATE FROM AMONG THE PLURALITY OF STATES ~S310

APPLY THE POWER SUPPLY VOLTAGE, AT A SECOND TIME POINT, TO AT LEAST ONE SECOND BIT-LINE COUPLED TO AT LEAST ONE SECOND CELL STRING CORRESPONDING TO A FIRST GROUP INCLUDING AN INTERMEDIATE STATE BETWEEN THE LOWER STATE AND AN UPPER STATE HAVING AN UPPERMOST VOLTAGE DISTRIBUTION FROM AMONG THE PLURALITY OF STATES ~S330

APPLY EACH OF A FIRST EFFECTIVE PROGRAM VOLTAGE, A SECOND EFFECTIVE PROGRAM VOLTAGE AND A THIRD EFFECTIVE PROGRAM VOTLAGE TO RESPECTIVE ONES OF MEMORY CELLS CORRESPONDING TO THE FIRST GROUP, MEMORY CELLS CORRESPONDING TO THE SECOND GROUP AND MEMORY CELLS CORRESPONDING TO A THIRD GROUP IN PARALLEL ~S410

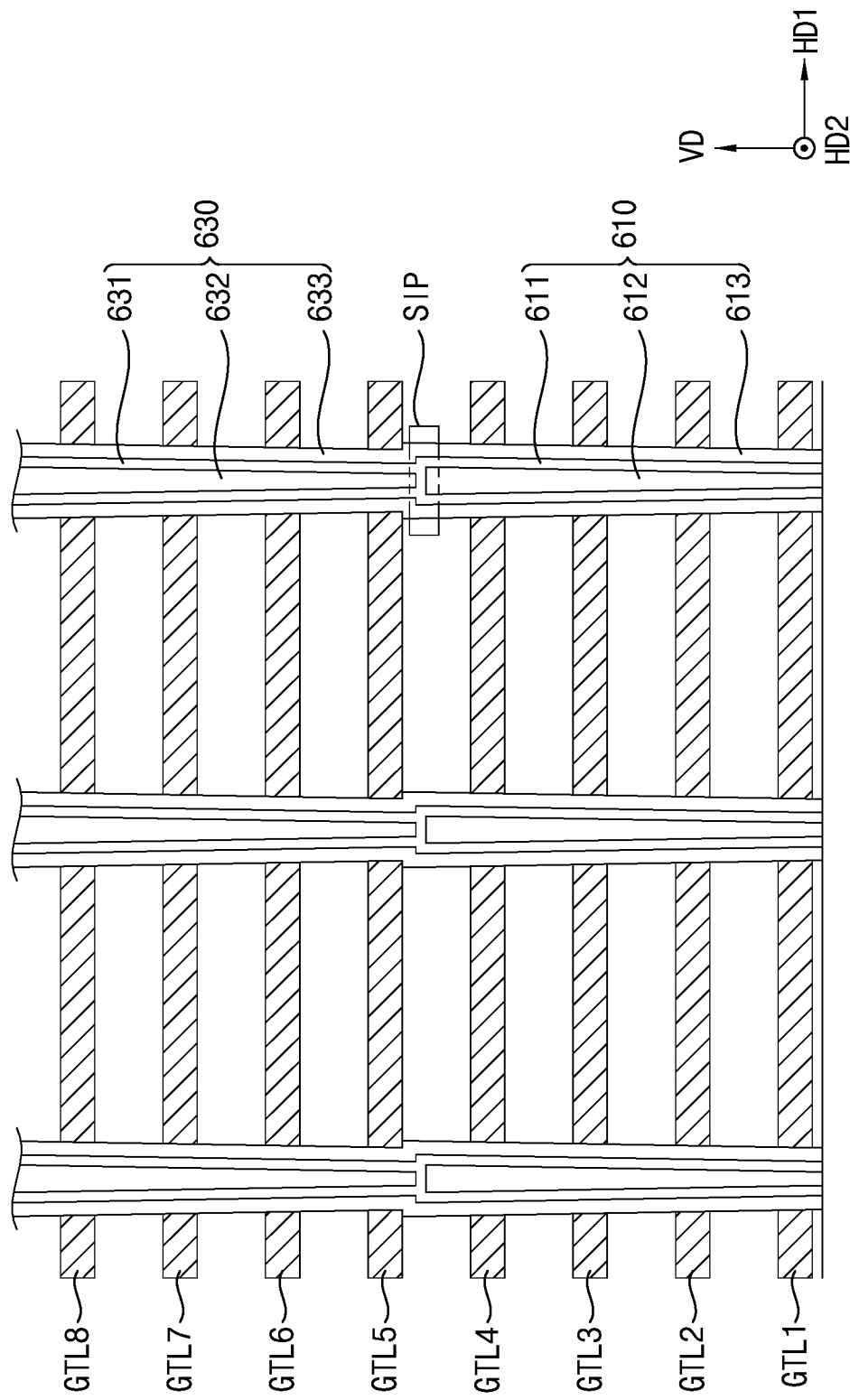

FIG. 29
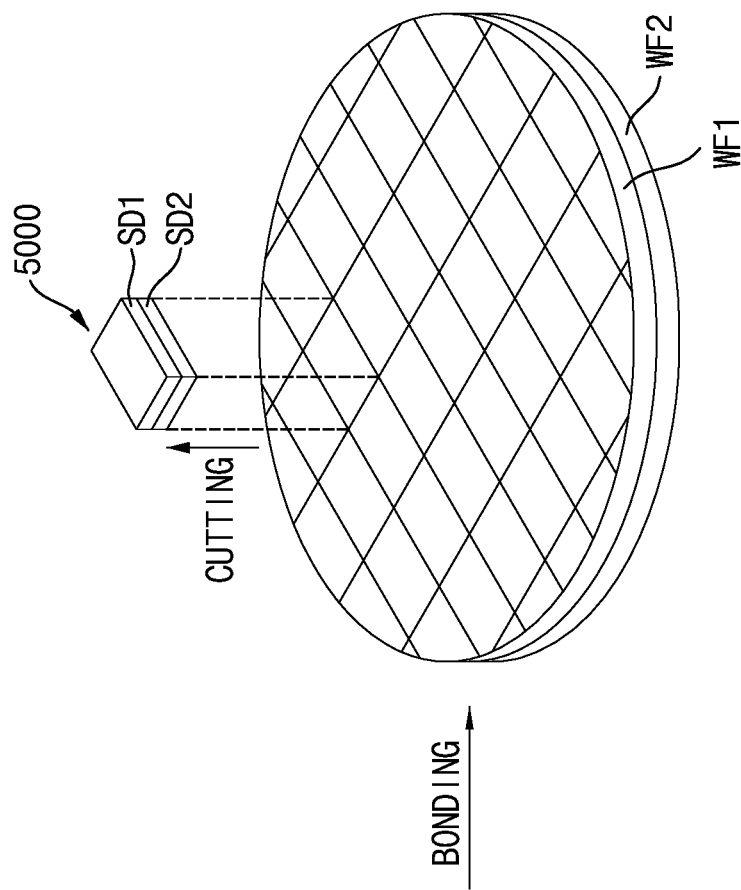
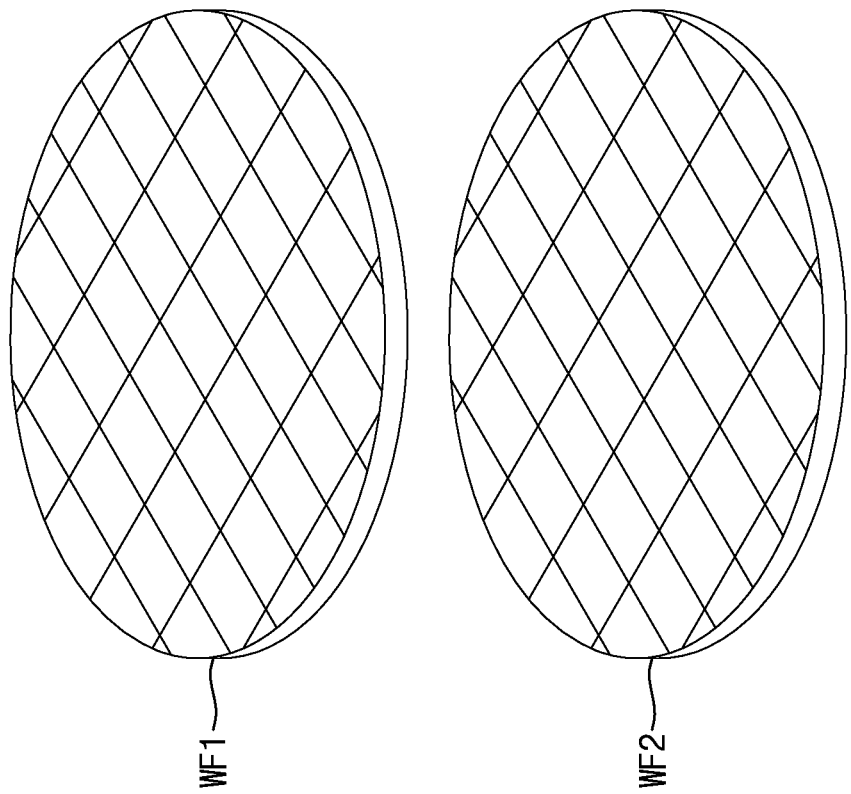

NONVOLATILE MEMORY DEVICE AND METHOD OF PROGRAMMING A NONVOLATILE MEMORY

CROSS-REFERENCE TO RELATED APPLICATIONS

This U.S. patent application claims priority under 35 USC § 119 to Korean Patent Application No. 10-2023-0004599, filed on Jan. 12, 2023, and to Korean Patent Application No. 10-2023-0036257, filed on Mar. 21, 2023, in the Korean Intellectual Property Office (KIPO), the disclosures of which are incorporated by reference in their entirety herein.

1. Technical Field

Example embodiments generally relate to semiconductor memory devices, and more particularly to a nonvolatile memory device and a method of programming the nonvolatile memory device.

2. Discussion of Related Art

Semiconductor memory devices for storing data may be classified into volatile memory devices and nonvolatile memory devices. Volatile memory devices, such as dynamic random access memory (DRAM) devices, store data by charging or discharging capacitors, but lose the stored data when power is not supplied. Nonvolatile memory devices, such as flash memory devices, maintain stored data even when power is not supplied. Volatile memory devices are widely used as main memories of various apparatuses, while nonvolatile memory devices are widely used for storing program codes and/or data in various electronic devices, such as computers, mobile devices, etc.

Recently, nonvolatile memory devices of a three-dimensional structure such as a vertical NAND memory devices have been developed to increase integration degree and memory capacity. However, programming time of the nonvolatile memory devices increases along with the increases in the integration degree and memory capacity.

SUMMARY

At least one example embodiment provides a nonvolatile memory device capable of reducing programming time interval.

At least one example embodiment provides a method of programming a nonvolatile memory device, capable of reducing programming time interval.

According to an example embodiment, a nonvolatile memory device includes at least one memory block and a control circuit. The at least one memory block includes a plurality of cell strings where each of the plurality of cell strings includes a string selection transistor, a plurality of memory cells and a ground selection transistor which are connected in series and disposed in a vertical direction between a bit-line and a common source line. The control circuit controls a first program operation by dividing program data having threshold voltage distributions which have a plurality of states into a plurality of groups, discharging target bit-lines coupled to selected cell strings among the plurality of cell strings corresponding to the plurality of groups to a ground voltage, during a bit-line set-up period of a program loop, discriminating a set-up timing of each of the target bit-lines based on target states of the plurality of groups during a first sub period of a program execution period of the program loop, in which a program voltage and a program pass voltage are ramping and applying the program voltage with a signal pulse having a second target level to a selected word-line of the plurality of cell strings, while applying the program pass voltage having a first target level to unselected word-lines of the plurality of cell strings, during a second sub period of the program execution period.

According to an example embodiment, there is provided a method of programming a nonvolatile memory device which includes at least one memory block including a plurality of cell strings where each of the plurality of cell strings includes a string selection transistor, a plurality of memory cells and a ground selection transistor which are connected in series and disposed in a vertical direction between a bit-line and a common source line. According to the method, program data having threshold voltage distributions which have a plurality of states is divided into a plurality of groups, target bit-lines coupled to selected cell strings among the plurality of cell strings corresponding to the plurality of groups are discharged to a ground voltage, during a bit-line set-up period of a program loop, a set-up timing of each of the target bit-lines is discriminated based on target states of the plurality of groups during a first sub period of a program execution period of the program loop, in which a program voltage and a program pass voltage are ramping and the program voltage with a signal pulse having a second target level is applied to a selected word-line of the plurality of cell strings, while applying the program pass voltage having a first target level to unselected word-lines of the plurality of cell strings, during a second sub period of the program execution period.

According to an example embodiment, a nonvolatile memory device includes at least one memory block, a control circuit and a voltage level detector. The at least one memory block includes a plurality of cell strings where each of the plurality of cell strings includes a string selection transistor, a plurality of memory cells and a ground selection transistor which are connected in series and disposed in a vertical direction between a bit-line and a common source line. The control circuit controls a first program operation by dividing program data having threshold voltage distributions which have a plurality of states into a plurality of groups, discharging target bit-lines coupled to selected cell strings among the plurality of cell strings corresponding to the plurality of groups to a ground voltage, during a bit-line set-up period of a program loop, discriminating a set-up timing of each of the target bit-lines based on a voltage level signal and target states of the plurality of groups during a first sub period of a program execution period of the program loop, in which a program voltage and a program pass voltage are ramping and applying the program voltage with a signal pulse having a second target level to a selected word-line of the plurality of cell strings, while applying the program pass voltage having a first target level to unselected word-lines of the plurality of cell strings, during a second sub period of the program execution period. The voltage level detector generates the voltage level signal by detecting a voltage level of the program pass voltage and provides the voltage level signal to the control circuit.

Accordingly, in the nonvolatile memory device and the method of programming the nonvolatile memory device, a set-up timing of each of the target bit-lines is discriminated based on target states of the plurality of groups during a first sub period of a program execution period, in which a program voltage and a program pass voltage are ramping and the program voltage with a signal pulse having a second target level is applied to a selected word-line of the plurality of cell strings, while applying the program pass voltage having a first target level to unselected word-lines of the plurality of cell strings, during a second sub period. Therefore, the plurality of program states may be concurrently programed by using the single-pulse program voltage to show the effect of a multi-pulse program voltage.

BRIEF DESCRIPTION OF THE DRAWINGS

The above and other features of the present disclosure will become more apparent by describing in detail embodiments thereof with reference to the accompanying drawings.

FIG. 6 is a flow chart illustrating an operation of discriminating the set-up timing of each of the target bit-lines in FIG. 1 according to an example embodiment.

FIG. 7 is a flow chart illustrating an operation of applying the program voltage to the selected word-line in FIG. 1 according to an example embodiment.

FIG. 24 is a cross-sectional view for describing an example embodiment of a boundary portion included in a memory block according to an example embodiment.

FIG. 29 is a diagram illustrating a manufacturing process of a stacked semiconductor device according to an example embodiment.

DETAILED DESCRIPTION

Figure 1:
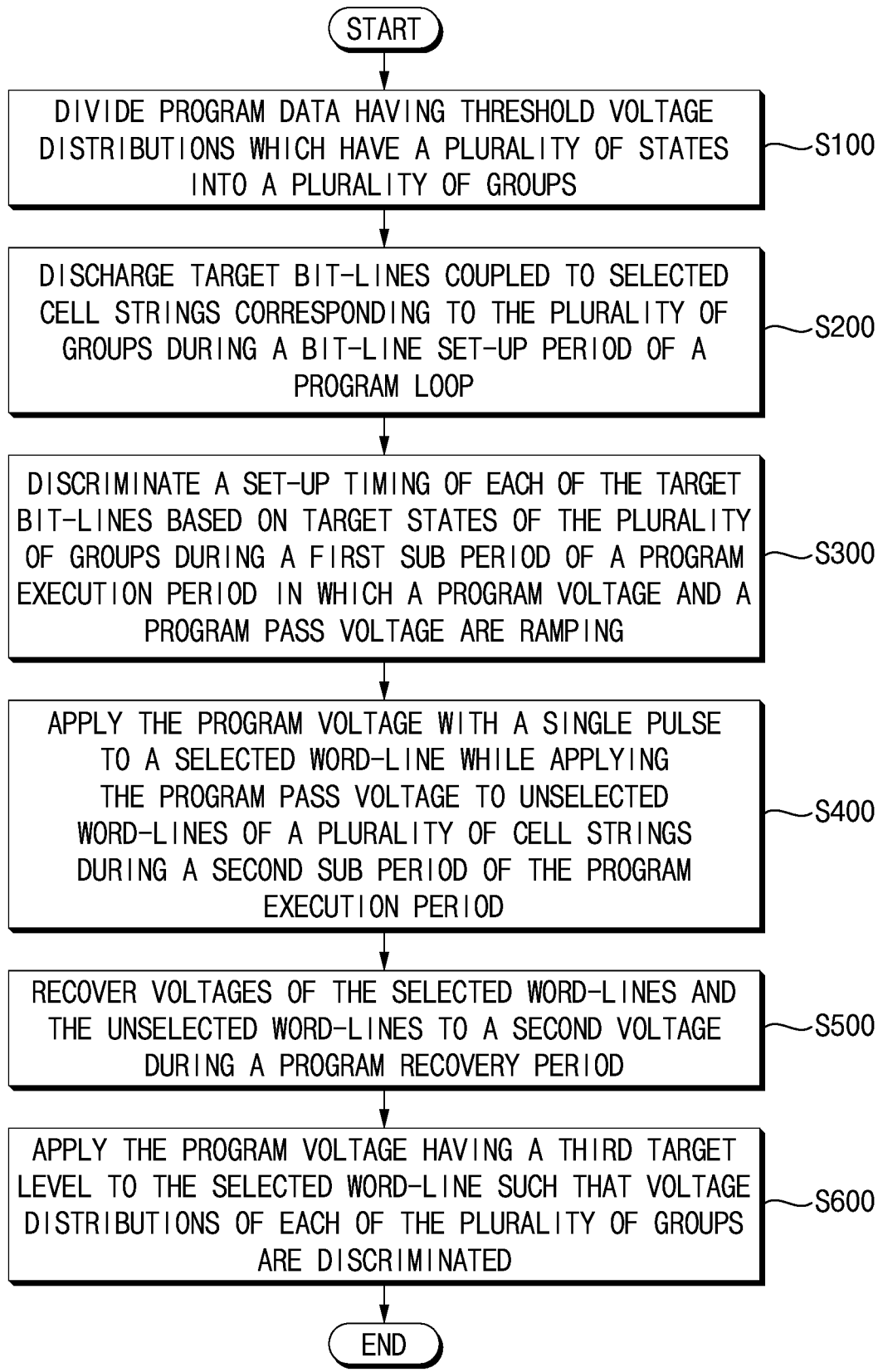
FIG. 1 is a flow chart illustrating a method of programming in a nonvolatile memory device according to an example embodiment.

Embodiments of the present disclosure will be described more fully hereinafter with reference to the accompanying drawings. Like reference numerals may refer to like elements throughout the accompanying drawings.

FIG. 1 is a flow chart illustrating a method of programming in a nonvolatile memory device according to an example embodiment.

FIG. 1 illustrates a method of programming in a nonvolatile memory device including at least one memory block which includes a plurality of cell strings, where each cell string includes a string selection transistor, a plurality of memory cells and a ground selection transistor connected between a bit-line and a common source line. According to example embodiments, the nonvolatile memory device may include a three-dimensional NAND flash memory device or a vertical NAND flash memory device.

Referring to FIG. 1, program data, received from an external memory controller, having threshold voltage distributions which have a plurality of states are divided into a plurality of groups (operation S100). Target bit-lines among the plurality of cell strings coupled to selected cell strings corresponding to the plurality of groups are discharged to a ground voltage, during a bit-line set-up period of a program loop (operation S200).

Channels of a plurality of cell strings may be precharged to a first voltage while the target bit-lines are discharged to the ground voltage. In general, the channels of the cell strings may be precharged through string selection transistors by a setup voltage of a bit-line during the bit-line set-up period. However, in case of programming the memory cells earlier since the memory cells are located at an upper position for reducing program disturbance, the channels cannot be precharged or initialized through the string selection transistors if any memory cell above the selected memory cell has been programmed from an erased state to a programmed state. Accordingly, the channels of the cell strings may be precharged through the ground selection transistors when the memory cells are programmed earlier since the memory cells are located at an upper position.

A three-dimensional NAND flash memory device is more vulnerable to the program disturbance since the size or the critical dimension (CD) of its channel hole is smaller. In case of a multiple level cell (MLC), the bit number programmed in each cell is increased. The number of the program loops is increased due to the increased number of the programmed states and thus performance degradation due to the program disturbance is increased. Accordingly the program operation may be performed along the direction of a size decrease of the channel hole as will be described below. When the program operation is performed along the direction of the size decrease of the channel hole, a bias voltage may be applied to a ground selection line and an unselect string initial precharge (USIP) may be performed using a voltage of the common source line.

A set-up timing of each of the target bit-lines based on target states of the plurality of groups is discriminated groups during a first sub period of a program execution period of the program loop, in which a program voltage and a program pass voltage are ramping (operation S300). The program voltage with a signal pulse having a second target level is applied to a selected word-line of the plurality of cell strings, while the program pass voltage having a first target level is applied to unselected word-lines of the plurality of cell strings, during a second sub period of the program execution period (operation S400).

The voltages of the selected word-line and the unselected word-lines are recovered to a second voltage greater than the ground voltage during a program recovery period of the program loop (operation S500). The program recovery period is successive to the program execution period. In this case, the voltages of the selected word-lines and the unselected word-lines are recovered to the second voltage, after recovering the voltages of the selected word-line and unselected word-lines of the plurality of cell strings to a negative voltage smaller than the ground voltage. When the voltages of the selected word-lines and the unselected word-lines are recovered to the second voltage after recovering the voltages of the selected word-line and the unselected word-lines to a negative voltage, the voltages of the selected word-line and the unselected word-lines may be stably recovered to a voltage before being precharged during a verification read period successive to the program recovery period. In this case, soft erase and hot carrier injection which may occur in the unselected word-lines may be prevented.

The program voltage having a third target level is applied to the selected word-line such that threshold voltage distributions having one or more states in each of the plurality of groups are discriminated with respect to each other after the program recovery period (operation S600).

The operations S200, S300, S400 and S500 may correspond to a first program operation and the operation S600 may correspond to a second program operation.

Memory cells on which the first program operation is performed may have a coarse threshold voltage distribution. For example, distributions in the respective program states may overlap other adjacent distributions. The first program operation may be referred to as a pre-program operation.

The second program operation may form a secondary fine distribution on memory cells on which a primary coarse distribution is formed. In other words, as the second program operation is performed, memory cells may have independent final threshold voltage distributions without an overlapping region. The second program operation may be referred to as a reprogram operation.

Figure 2:
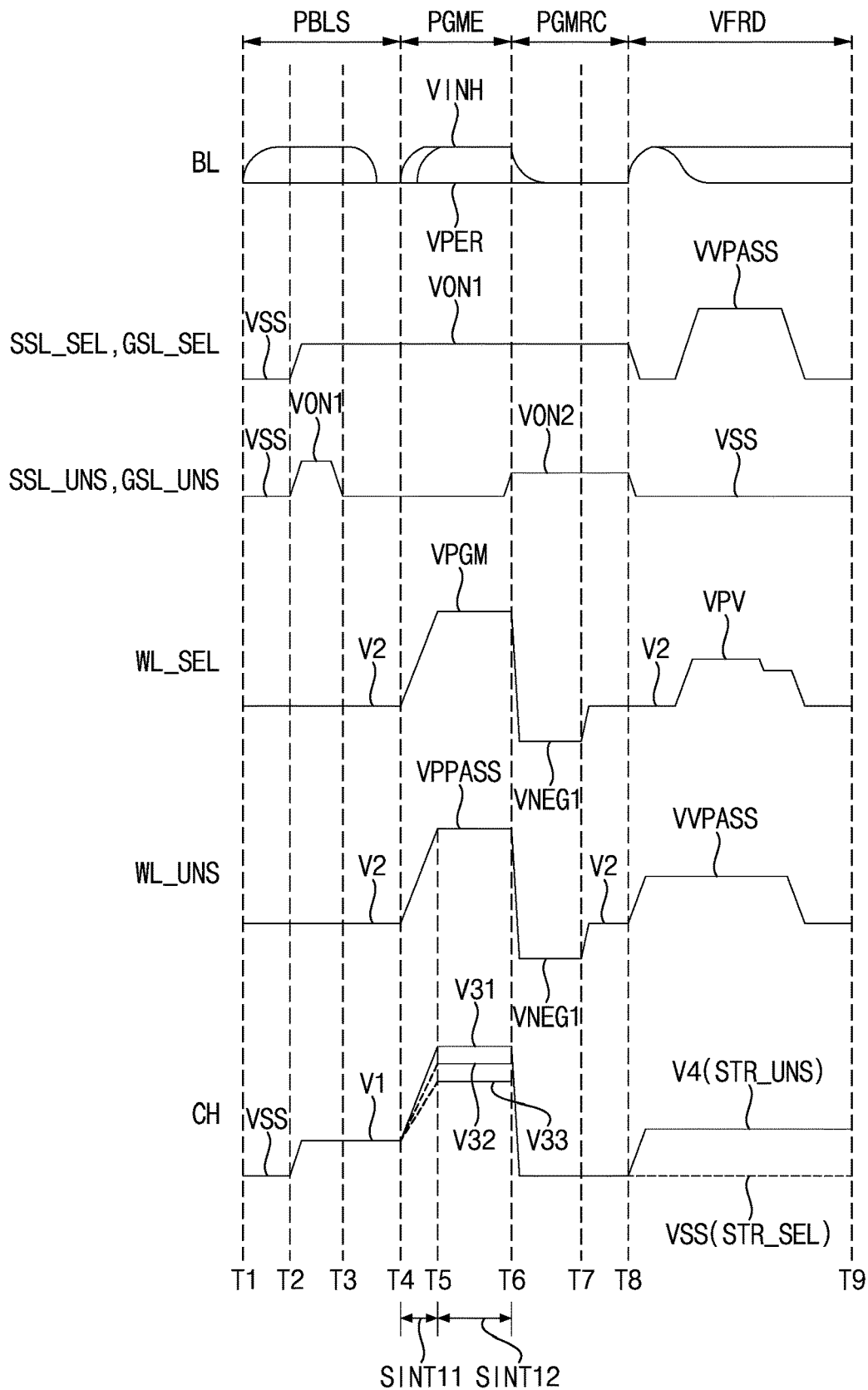
FIG. 2 is a timing diagram illustrating a method of performing a first program operation in a nonvolatile memory device according to an example embodiment.

FIG. 2 is a timing diagram illustrating a method of performing a first program operation on a nonvolatile memory device according to an example embodiment.

FIG. 2 illustrates a bit-line set-up period PBLS, a program execution period PGME, a program recovery period PGMRC and a verification read period VFRD of one of a plurality of program loops. The program execution period PGME may include a first sub period SINT11 and a second sub-period SINT12. Time points T1~T9 represents boundaries of the periods.

Referring to FIG. 2, during the bit-line set-up period PBLS, a ground voltage VSS is applied to a string selection line SSL_SEL and a ground selection line GSL_SEL of a selected cell string from the time point T1 to the time point T2 and a first turn-on voltage VON1 is applied to the string selection line SSL_SEL and the ground selection line GSL_SEL of the selected string from the time point T2 to the time point T4. The ground voltage VSS is applied to a string selection line SSL_UNS and a ground selection line GSL_UNS of an unselected cell string from the time point T1 to the time point T2, the first turn-on voltage VON1 is applied to the string selection line SSL_UNS and the ground selection line GSL_UNS of the unselected cell string from the time point T2 to the time point T3 and the ground voltage VSS is applied to the string selection line SSL_UNS and the ground selection line GSL_UNS of the unselected cell string from the time point T3 to the time point T4. In an example embodiment, levels of voltages applied to the string selection line SSL_UNS and the ground selection line GSL_UNS of the unselected cell string are varied according to a position of the unselected cell string.

A second voltage V2 greater than the ground voltage VSS is applied to a selected word-line WL_SEL and an unselected word-line WL_ULS from the time point T1 to the time point T4. Accordingly, a channel of each of the cell strings is precharged from the ground voltage VSS to the first voltage V1. That is, a channel of each of the cell strings is precharged to the first voltage V1 by performing an unselect string initial precharge (USIP).

The USIP may be performed by using a gate induced drain leakage (GIDL). As understood from the name itself, the GIDL indicates a phenomenon that a leakage occurs at a drain of a transistor by a gate of the transistor. For example, when 0V or a negative voltage level is applied to the gate and a sufficiently high positive voltage is applied to the drain, severe band bending may be induced in the oxide near the drain and thus band-to-band tunneling from the valence band of the silicon surface to the conduction band of the silicon body may occur.

The tunneling electrons are attracted to the drain and the drain current increases. When the semiconductor substrate is biased by a ground voltage, holes are attracted to the semiconductor substrate of a relatively low voltage. The gate voltage of a negative voltage level is used to turn off the transistor, but the transistor operates as if it is turned on because the drain current of the GIDL current increases due to the GIDL phenomenon. The GIDL current increases as the gate voltage is decreased and/or the drain voltage is increased.

The channels of each of the cell strings may be precharged by using the GIDL. For generating the GIDL phenomenon, a string selection transistor of a cell string, a ground selection transistor of a cell string, or a GIDL transistor may be used, which will be described with reference to FIGS. 12B through 12D.

A program inhibit voltage VINH or a program permission voltage VPER is applied to a bit-line BL based on a value of write data at a starting point T1 of the bit-line set-up period PBLS. Target bit-lines coupled to a selected cell string in which a write data to be programmed may be discharged to the ground voltage when the program permission voltage VPER is applied to the target bit-lines.

During a first sub period SINT11 of the program execution period PGME between the time point T4 and the time point T5, successive to the bit-line set-up period PBLS, the first turn-on voltage VON1 is applied to string selection line SSL_SEL and the ground selection line GSL_SEL of the selected string, a program voltage VPGM that is ramping is applied to the selected word-line WL_SEL and a program pass voltage VPPASS that is ramping is applied to the unselected word-line WL_UNS. Accordingly, a voltage level of the channel CH of each of the cell strings is increased to a third voltage V3. During the first sub period SINT11, a set-up timing of the bit-line BL (i.e., a timing at which the program inhibit voltage VINH is applied to the bit-line BL) is discriminated based on a target state of each of a plurality of groups associated with the write data. During the program execution period PGME, the level of the bit-line BL is maintained at the program inhibit voltage VINH or the program permission voltage VPER based on the value of the write data.

During a second sub period SINT12 of the program execution period PGME between the time point T5 and the time point T6, the program pass voltage VPPASS having a first target level is applied to the unselected word-lines and the program voltage VPGM having a second target level is applied to the selected word-line. When the program inhibit voltage VINH is applied to the bit-line BL during the first sub period SINT11, a channel of a cell string coupled to the bit-line BL is floated and thus, is coupled to the program pass voltage VPPASS that is ramping. Therefore, a voltage of the channel of the cell string coupled to the bit-line BL increases until the program pass voltage VPPASS reaches the first target level. When the program voltage VPGM having the second target level is applied to the selected word-line during the second sub period SINT12, effective program voltages having different voltage levels may be applied to respective ones of memory cells corresponding to the plurality of groups according to difference of set-up timings of the bit-line BL.

During the program recovery period PGMRC between the time point T6 and the time point T8, successive to the program execution period PGME, the first turn-on voltage VON1 is applied to the string selection line SSL_SEL and the ground selection line GSL_SEL of the selected string, a second turn-on voltage VON2 smaller than the first turn-on voltage VON1 is applied to the string selection line SSL_UNS and the ground selection line GSL_UNS of the unselected cell string. Accordingly, a voltage level of the channel CH of each of the cell strings is increased to a third voltage (e.g., V31, V32, or V33). In addition, after a first negative voltage VNEG1 is applied to the selected word-line WL_SEL and the unselected word-line WL_UNS from the time point T6 and to the time point T7, the second voltage V2 is applied to the selected word-line WL_SEL and the unselected word-line WL_UNS from the time point T7 and to the time point T8. The selected word-line WL_SEL and the unselected word-line WL_UNS are recovered to the second voltage V2 after the selected word-line WL_SEL and the unselected word-line WL_UNS are recovered to the first negative voltage VNEG1. Since the first turn-on voltage VON1 is applied to the string selection line SSL_SEL and the ground selection line GSL_SEL of the selected string, and the second turn-on voltage VON2 is applied to string selection line SSL_UNS and the ground selection line GSL_UNS of the unselected cell string, the selected cell string and the unselected cell string are open, and thus the voltage level of the channel CH of each of the cell strings is lowered to a voltage level at or around the ground voltage VSS, and is maintained. The voltage level of the bit-line BL converges to the program permission voltage VPER during the program recovery period PGMRC.

During the verification read period VFRD between the time point T8 and the time point T9, successive to the recovery period PGMRC, a verification pass voltage VVPASS is applied to string selection line SSL_SEL and the ground selection line GSL_SEL of the selected string, and the ground voltage VSS is applied to the string selection line SSL_UNS and the ground selection line GSL_UNS of the unselected cell string. In addition, a verification read voltage VPV is applied to the selected word-line WL_SEL and the verification pass voltage VVPASS is applied to the unselected word-line WL_UNS. Therefore, a voltage level of the channel of the selected cell string STR_SEL is maintained at a voltage level at or around the ground voltage VSS, and a voltage level of the channel of the unselected cell string STR_UNS is increased to a fourth voltage V4. In an embodiment, the fourth voltage V4 is smaller than the third voltage and is greater than the first voltage V1. Therefore, the soft erase which may occur in the unselected cell string STR_UNS and the hot carrier injection which may occur at an edge of the selected cell string STR_SEL may be prevented.

It is assumed that a voltage level (i.e., a potential) of the channel, which is not lowered during the program recovery period PGMRC, has a first level corresponding to a precharged voltage. During the verification read period VFRD, when the verification read voltage VPV is applied to the selected word-line WL_SEL and the verification pass voltage VVPASS is applied to the unselected word-line WL_UNS, a voltage level of the unselected cell string has a high level corresponding to the first level and the level of the verification pass voltage. Accordingly, the soft erase may occur in memory cells of the unselected cell string due to high voltage level of the channel of the unselected cell string. In addition, since a voltage level of the channel of the selected cell string rapidly changes from the first level to the level of the ground voltage VSS, leakage current is HCl-injected to a string selection transistor or a ground selection transistor of the selected cell string due to rapid change of the channel and a threshold voltage of the string selection transistor or the ground selection transistor may increase.

Although not illustrated in FIG. 2, during a bit-line precharge period before the verification read period VFRD, all of the bit-lines may be initialized by the same bit-line precharge voltage. A voltage of a bit-line should reach a voltage corresponding to '1' or '0' depending on the threshold voltage state of the selected memory cell during the verification read period VFRD. The data stored in the selected memory cell may be determined by sensing the final voltage of the bit-line.

Figure 3:
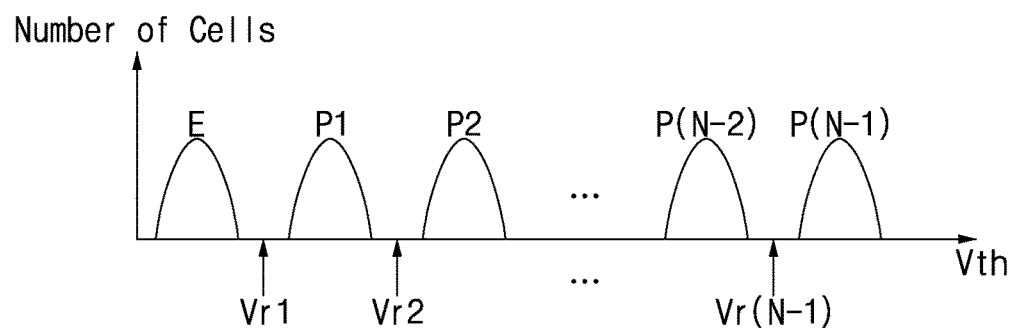
FIG. 3 is a graph showing a threshold voltage distribution associated with data stored in a nonvolatile memory device according to an example embodiment.

FIG. 3 is a graph showing a threshold voltage distribution associated with data stored in a nonvolatile memory device according to an example embodiment.

Referring to FIG. 3, a horizontal axis represents a threshold voltage Vth and the vertical axis represents the number of memory cells. The threshold voltage Vth may be set to one of a plurality of states E, P1, P2, . . . , P(N−2), P(N−1), where N is a natural number greater than 4. For example, the state E may represent an erase state, and the states P1 to P(N−1) may represent a plurality of program states.

In an example embodiment, a plurality of memory cells that are included in each page and each page data includes multi-level memory cells (MLCs) each of which stores two or more data bits. Hereinafter, the multi-level memory cell may refer to not only a memory cell storing two data bits, but also a memory cell storing three data bits (e.g., a triple level memory cell (TLC)), a memory cell storing four data bits (e.g., a quad level memory cell (QLC)), or the like. For example, N=8 in a case of the triple level memory cell, and N=16 in a case of the quad level memory cell, however, example embodiments are not limited thereto.

In an example embodiment, a plurality of read voltages Vr1, Vr2, . . . , Vr(N−1) are used to distinguish or determine the plurality of states E and P1 to P(N−1). For example, it may be distinguished using the read voltage Vr1 whether it is the erase state E or the program state P1, and it may be distinguished using the read voltage Vr2 whether it is the program state P1 or the program state P2.

Figure 4A:
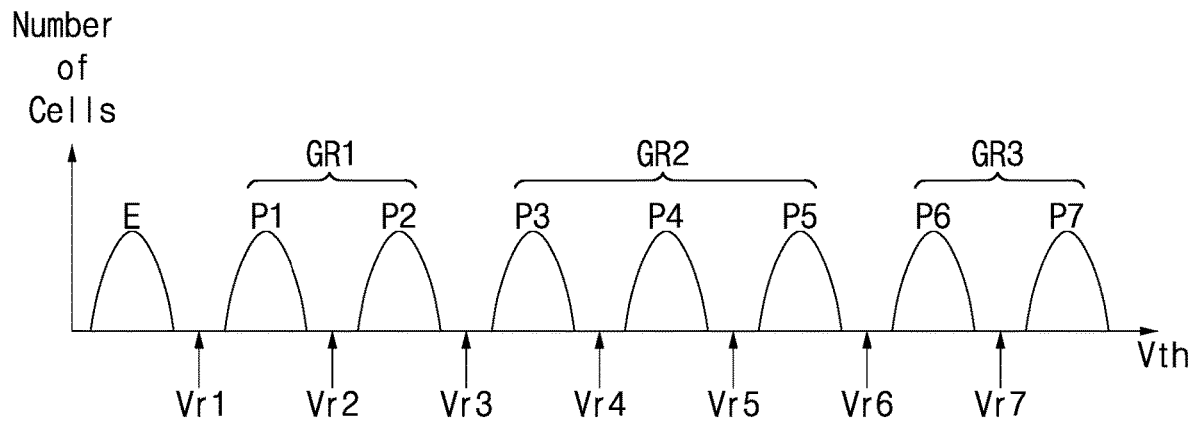
FIG. 4A is a graph showing a threshold voltage distribution of memory cells when a memory cell is a 3-bit triple level cell.

FIG. 4A is a graph showing a threshold voltage distribution of memory cells when a memory cell is a 3-bit triple level cell (TLC).

Referring to FIG. 4A, a horizontal axis represents a threshold voltage Vth and the vertical axis represents the number of memory cells. When each of the memory cells is a 3-bit triple level cell programmed to store 3 bits, the memory cell may have one from among an erase state E and first through seventh program states P1 through P7. When a memory cell is a multi-level cell, unlike a single-level cell, since an interval between threshold voltages distributions is small, a small change in the threshold voltage Vth may prevent data from being read properly.

A first read voltage Vr1 has a voltage level between a distribution of a memory cell having the erase state E and a distribution of a memory cell having the first program state P1. Each of second through seventh read voltages Vr2 through Vr7 have a voltage level between distributions of memory cells having adjacent program states.

In an example embodiment, the first and second program states P1 and P2 are grouped into a first group GR1, the third through fifth program states P3, P4 and P5 are grouped into a second group GR2, and the sixth and seventh program states P6 and P7 are grouped into a third group GR3. The first group may include a lower state P1 (i.e., the first program state) having a lowermost voltage distribution, the third group GR3 may include an upper state P7 (i.e., the seventh program state) including an uppermost voltage distribution and the second group GR2 may include an intermediate state P3 (i.e., the third program state) between the lower state P1 and the upper state P7.

Figure 4B:
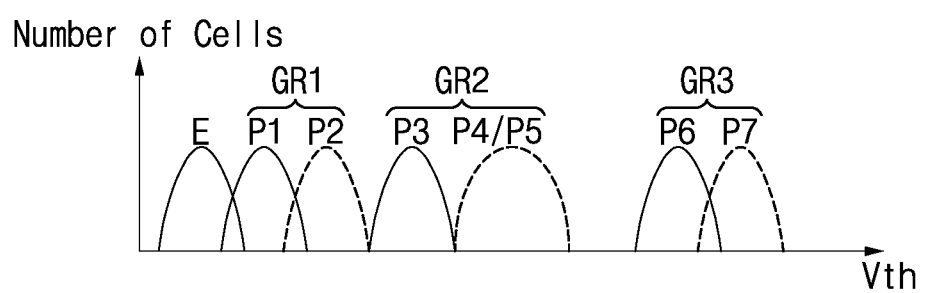
FIG. 4B is a graph showing a threshold voltage distribution of memory cells when a memory cell is a 3-bit triple level cell and a first program operation is performed on the memory cells.

FIG. 4B is a graph showing a threshold voltage distribution of memory cells when a memory cell is a 3-bit triple level cell (TLC) and a first program operation is performed on the memory cells.

Referring to FIG. 4B, when a first program operation is performed on the memory cells, voltage distributions of the first and second program states P1 and P2 of the first group GR1 are partially overlapped, the third through fifth program states P3, P4 and P5 of the second group GR2 are partially overlapped and the sixth and seventh program states P6 and P7 of the third group GR3 are partially overlapped.

The first program operation may be concurrently performed on the first through seventh program states P1~P7 by applying the program voltage VPGM with a single pulse to the selected word-line during the program execution period PGME in FIG. 2.

When the second program operation is performed on the memory cells, the memory cells may have threshold voltage distributions as in FIG. 4A.

Figure 5:
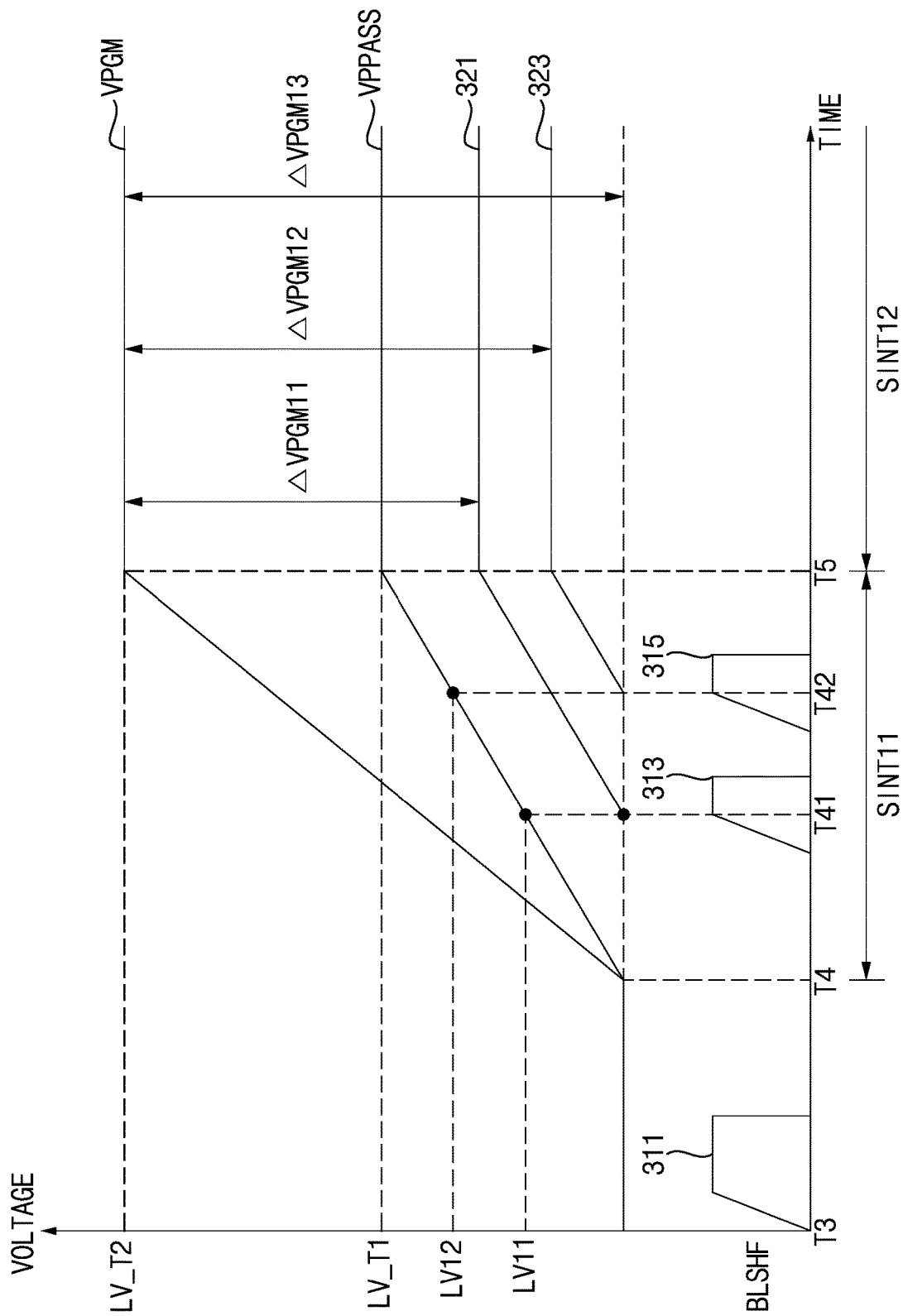
FIG. 5 is a graph illustrating a program execution period in detail according to an example embodiment.

FIG. 5 is a graph illustrating a program execution period in detail according to an example embodiment.

In FIG. 5, the first sub period SINT11 and the second sub period SINT12 of the program execution period PGME in FIG. 2 are illustrated in detail and a portion between the time points T3 and T4 of the bit-line set-up period PBLS is also illustrated for convenience of explanation.

Referring to FIG. 5, since a bit-line shut-off signal BLSHF is applied to page buffers coupled to memory cells in erased state as a reference numeral 311 indicates, target bit-lines coupled to cell strings corresponding to a plurality of groups of the plurality of program states P1~P7 are discharged to the ground voltage.

During the first sub period SINT11 in which the program pass voltage VPPASS and the program voltage VPGM are ramping (i.e., increase gradually) between the time points T4 and t5, the set-up timing of each of the target bit-lines is discriminated according to a target state of each of the plurality of groups based on a voltage level of the program pass voltage VPPASS. For example, the program voltage VPGM may linearly increase during the ramping but the embodiments are not limited to changing linearly.

The bit-line shut-off signal BLSHF is applied to a corresponding page buffer at a first time point T41 at which the program pass voltage VPPASS has a first voltage level LV11 as a reference numeral 313 indicates such that a power supply voltage is applied to at least one first bit-line coupled to at least one first cell string corresponding to the first group GR1 including the first and second program states P1 and P2 and the bit-line shut-off signal BLSHF is applied to a corresponding page buffer at a second time point T42 at which the program pass voltage VPPASS has a first voltage level LV11 after the first time point T41 as a reference numeral 315 indicates such that the power supply voltage is applied to at least one second bit-line coupled to at least one second cell string corresponding to the second group GR2 including the third through fifth program states P3, P4 and P5.

When the power supply voltage is applied to the at least one first bit-line at the first time point T41, a first channel of the at least one first cell string is floated and coupled to the program pass voltage VPPASS at the first time point T41 and a voltage level of the first channel increases according to a voltage level of the program pass voltage VPPASS. When the power supply voltage is applied to the at least one second bit-line at the second time point T42, a second channel of the at least one second cell string is floated and coupled to the program pass voltage VPPASS at the second time point T42 and a voltage level of the second channel increases according to a voltage level of the program pass voltage VPPASS. That is, when the set-up timing of each of the target bit-lines is discriminated (i.e., differentiated) based on a target state of each of the plurality of groups, time points at which channels of cell strings corresponding to the plurality of groups are coupled to the program pass voltage VPPASS are discriminated.

When the program pass voltage VPPASS reaches a first target level LV_T1 and the program voltage VPGM reaches a second target level LV_T2 in the second sub period SINT12 between the time points T5 and T6, the program pass voltage VPPASS having the first target level LV_T1 is applied to the unselected word-lines and the program voltage VPGM having the second target level LV_T2 is applied to the selected word-line. A reference numeral 321 represents a voltage level of the first channel and a numeral 323 represents a voltage level of the second channel.

An effective program voltage applied to memory cells corresponds to a difference between the program voltage VPGM applied to the selected word-line and a voltage of a channel of each of selected cell strings.

While the program voltage VPGM having the second target level LV_T2 is applied to the selected word-line, each of a first effective program voltage ΔVPGM11, a second effective program voltage ΔVPGM12 and a third effective program voltage ΔVPGM13 is applied to respective ones of memory cells corresponding to the first group GR1, memory cells corresponding to the second group GR2 and memory cells corresponding to the third group GR3 in parallel.

In an embodiment, a voltage level of the second effective program voltage ΔVPGM12 is greater than a voltage level of the first effective program voltage ΔVPGM11 and a voltage level of the third effective program voltage ΔVPGM13 is greater than the voltage level of the second effective program voltage ΔVPGM12.

Figure 9:
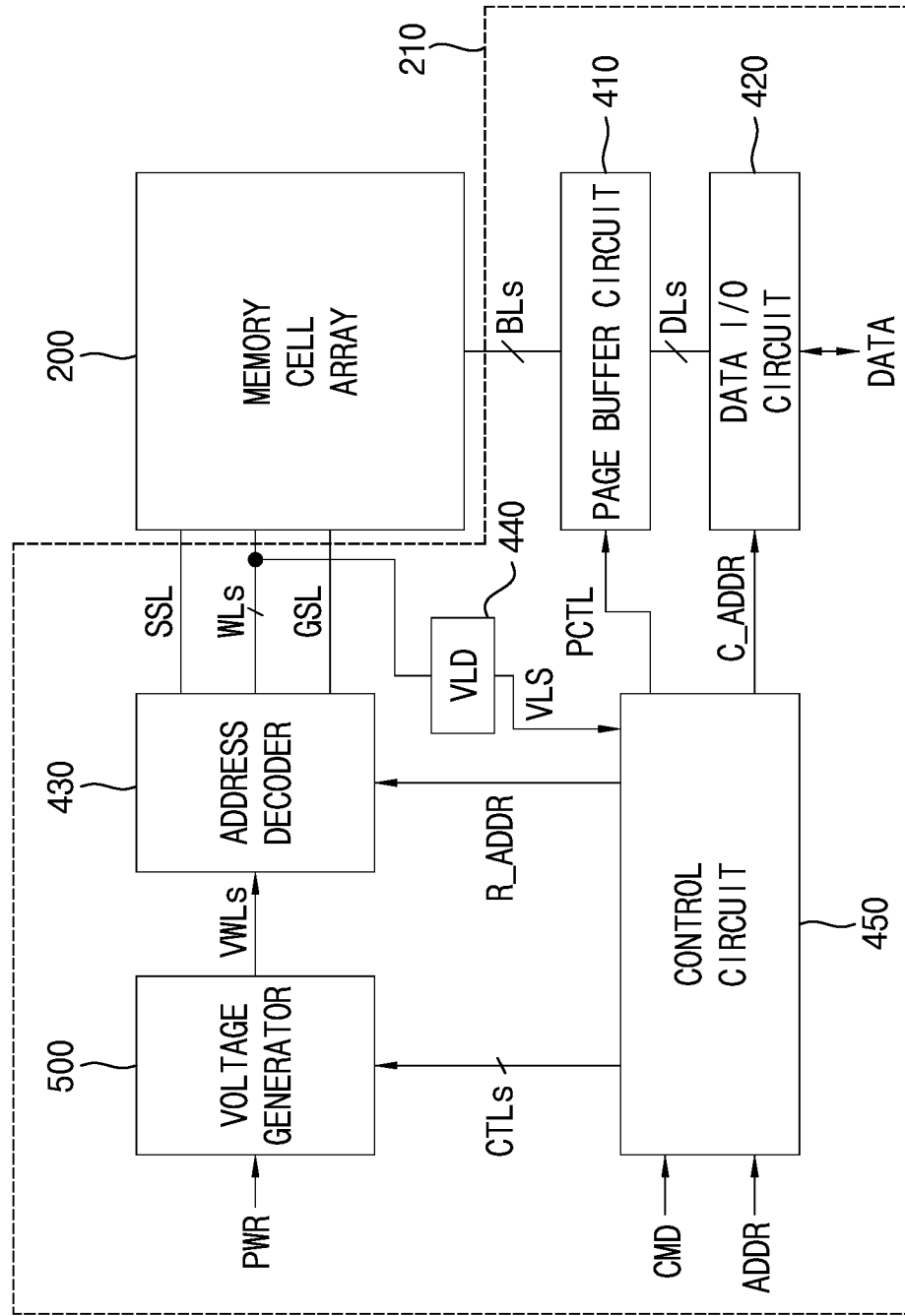
FIG. 9 is a block diagram illustrating an example of the nonvolatile memory device in the memory system of FIG. 8 according to an example embodiment.

The first time point T41 and the second time point T42 may be determined based on a voltage level of the program pass voltage VPPASS that is ramping by a control circuit (e.g., see 450 in FIG. 9).

In an example embodiment, a number of the plurality of groups is determined based on a number of the plurality of states of the program data to be programed in the memory cells by the control circuit (450 in FIG. 9).

FIG. 6 is a flow chart illustrating an operation of discriminating the set-up timing of each of the target bit-lines in FIG. 1 according to an example embodiment.

Referring to FIGS. 5 and 6, for discriminating the set-up timing of each of the target bit-lines (operation S300), the power supply voltage is applied to the at least one first bit-line coupled to the at least one first cell string corresponding to the first group GR1 at the first time point T41 (operation S310). To continue the discriminating, the power supply voltage is applied to the at least one second bit-line coupled to the at least one second cell string corresponding to the second group GR2 at the second time point T42 after the first time point T41 (operation S330).

FIG. 7 is a flow chart illustrating an operation of applying the program voltage to the selected word-line in FIG. 1 according to an example embodiment.

Referring to FIGS. 5 and 7, when the program voltage VPGM with a single pulse is applied to the single pulse (operation S400), each of a first effective program voltage ΔVPGM11, a second effective program voltage ΔVPGM12 and a third effective program voltage ΔVPGM13 is applied to respective ones of memory cells corresponding to the first group GR1, memory cells corresponding to the second group GR2 and memory cells corresponding to the third group GR3 in parallel (operation S410).

Therefore, in a method of programming in a nonvolatile memory device according to an example embodiment, a single-pulse program voltage may be used to show the effect of a multi-pulse program voltage.

Figure 8:
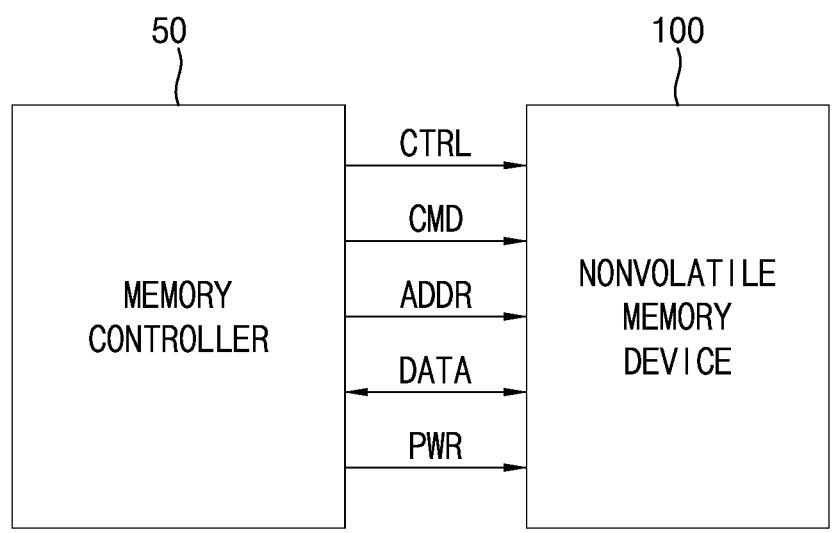
FIG. 8 is a block diagram illustrating a memory system according to an example embodiment.

FIG. 8 is a block diagram illustrating a memory system according to an example embodiment.

Referring to FIG. 8, a memory system 10 includes a memory controller 50 (e.g., a controller circuit) and a nonvolatile memory device 100.

In example embodiments, each of the memory controller 50 and the nonvolatile memory device 100 may be provided with the form of a chip, a package, or a module. Alternatively, the memory controller 50 and the nonvolatile memory device 100 may be packaged into one of various packages.

The nonvolatile memory device 100 may perform an erase operation, a program operation or a read operation under control of the memory controller 50. The nonvolatile memory device 100 receives a command CMD, an address ADDR and data DATA through input/output lines from the memory controller 50 for performing such operations. In addition, the nonvolatile memory device 100 receives a control signal CTRL through a control line from the memory controller 50. In addition, the nonvolatile memory device 100 receives power PWR through a power line from the memory controller 50.

FIG. 9 is a block diagram illustrating an example of the nonvolatile memory device in the memory system of FIG. 8 according to an example embodiment.

Referring to FIG. 9, the nonvolatile memory device 100 includes a memory cell array 200 and a peripheral circuit 210. The peripheral circuit 210 includes an address decoder 430 (e.g., decoder circuit), a page buffer circuit 410, a data input/output (I/O) circuit 420, a voltage level detector VLD 440 (e.g., detector circuit), a control circuit 450 and a voltage generator 500.

The memory cell array 200 may be coupled to the address decoder 430 through a string selection line SSL, a plurality of word-lines WLs, and a ground selection line GSL. In addition, the memory cell array 200 may be coupled to the page buffer circuit 410 through a plurality of bit-lines BLs. The memory cell array 200 may include a plurality of nonvolatile memory cells coupled to the plurality of word-lines WLs and the plurality of bit-lines BLs.

In an example embodiment, the memory cell array 200 is a three-dimensional memory cell array, which is formed on a substrate in a three-dimensional structure (or a vertical structure). In this case, the memory cell array 200 may include (vertical) cell strings that are vertically oriented such that at least one memory cell is located over another memory cell.

The control circuit 450 may receive a command (signal) CMD and an address (signal) ADDR from the memory controller 50 and control an erase loop, a program loop and a read operation of the nonvolatile memory device 200 based on the command signal CMD and the address signal ADDR. The program loop may include a program operation and a program verification operation. The erase loop may include an erase operation and an erase verification operation.

For example, the control circuit 450 may generate control signals CTLs to control the voltage generator 500 and may generate a page buffer control signal PCTL to control the page buffer circuit 410 based on the command signal CMD. The control circuit 450 may generate a row address R_ADDR and a column address C_ADDR based on the address signal ADDR. The control circuit 450 may provide the row address R_ADDR to the address decoder 430 and provide the column address C_ADDR to the data input/output circuit 420.

The address decoder 430 may be coupled to the memory cell array 200 through the string selection line SSL, the plurality of word-lines WLs, and the ground selection line GSL. During the program operation or the read operation, the address decoder 430 may determine one of the plurality of word-lines WLs as a selected word-line and determine the rest of the plurality of word-lines WLs except for the selected word-line as unselected word-lines based on the row address R_ADDR.

The voltage generator 500 may generate word-line voltages VWLs, which are associated with operation of the nonvolatile memory device 200, based on the control signals CTLs. The voltage generator 500 may receive the power PWR from the memory controller 50. The word-line voltages VWLs may be applied to the plurality of word-lines WLs through the address decoder 430.

For example, during the erase operation, the voltage generator 500 may apply an erase voltage to channels of a cell string of the memory block and may apply a ground voltage to entire word-lines of the memory block. During the erase verification operation, the voltage generator 500 may apply an erase verification voltage to the entire word-lines of the memory block or sequentially apply the erase verification voltage to word-lines in a word-line basis. For example, the voltage generator 500 may apply the erase verification voltage to a first word-line among the word-lines at a first time, apply the erase verification voltage to a second word-line among the word-lines at a second time after the first time, etc.

For example, during the program operation, the voltage generator 500 may apply a program voltage to the selected word-line and may apply a program pass voltage to the unselected word-lines. In addition, during the program verification operation, the voltage generator 500 may apply a program verification voltage to the selected word-line and may apply a verification pass voltage to the unselected word-lines. For example, during the read operation, the voltage generator 500 may apply a read voltage to the selected word-line and may apply a read pass voltage to the unselected word-lines.

The page buffer circuit 410 may be coupled to the memory cell array 200 through the plurality of bit-lines BLs. The page buffer circuit 410 may include a plurality of page buffers. The page buffer circuit 410 may temporarily store data to be programmed in a selected page or data read out from the selected page.

The data input/output circuit 420 may be coupled to the page buffer circuit 410. During the program operation, the data input/output circuit 420 may receive program data DATA from the memory controller 50 and provide the program data DATA to the page buffer circuit 410 based on the column address C_ADDR received from the control circuit 450. During the read operation, the data input/output circuit 420 may provide read data DATA, which are stored in the page buffer circuit 410, to the memory controller 50 based on the column address C_ADDR received from the control circuit 450.

The voltage level detector 440 may detect a voltage level of the program pass voltage applied to unselected word-lines from among the plurality of word-lines WLs and may provide the control circuit 450 with a voltage level signal VLS indicating a voltage level of the detected program pass voltage.

The control circuit 450 may discriminate the set-up timing of each of the target bit-line among the bit-lines BLs according to a target state of each of the plurality of groups based on the voltage level signal VLS during the first sub period of the above-mentioned program execution period. The control circuit 450 may control the first program operation and the second program operation described with reference to FIGS. 1 through 6. The control circuit 450 may control the first program operation by dividing program data having threshold voltage distributions which have a plurality of states into a plurality of groups, discharging target bit-lines coupled to selected cell strings from among the plurality of cell strings corresponding to the plurality of groups to a ground voltage, during a bit-line set-up period of a program loop, discriminating a set-up timing of each of the target bit-lines based on target states of the plurality of groups during a first sub period of a program execution period of the program loop, in which a program voltage and a program pass voltage are ramping, and applying the program voltage with a signal pulse having a second target level to a selected word-line of the plurality of cell strings, while applying the program pass voltage having a first target level to unselected word-lines of the plurality of cell strings, during a second sub period of the program execution period. The control circuit 450 may perform a second program operation by applying the program voltage having a third target level to the selected word-line such that threshold voltage distributions having one or more states in each of the plurality of groups are discriminated with respect to each other after the program recovery period.

Figure 10:
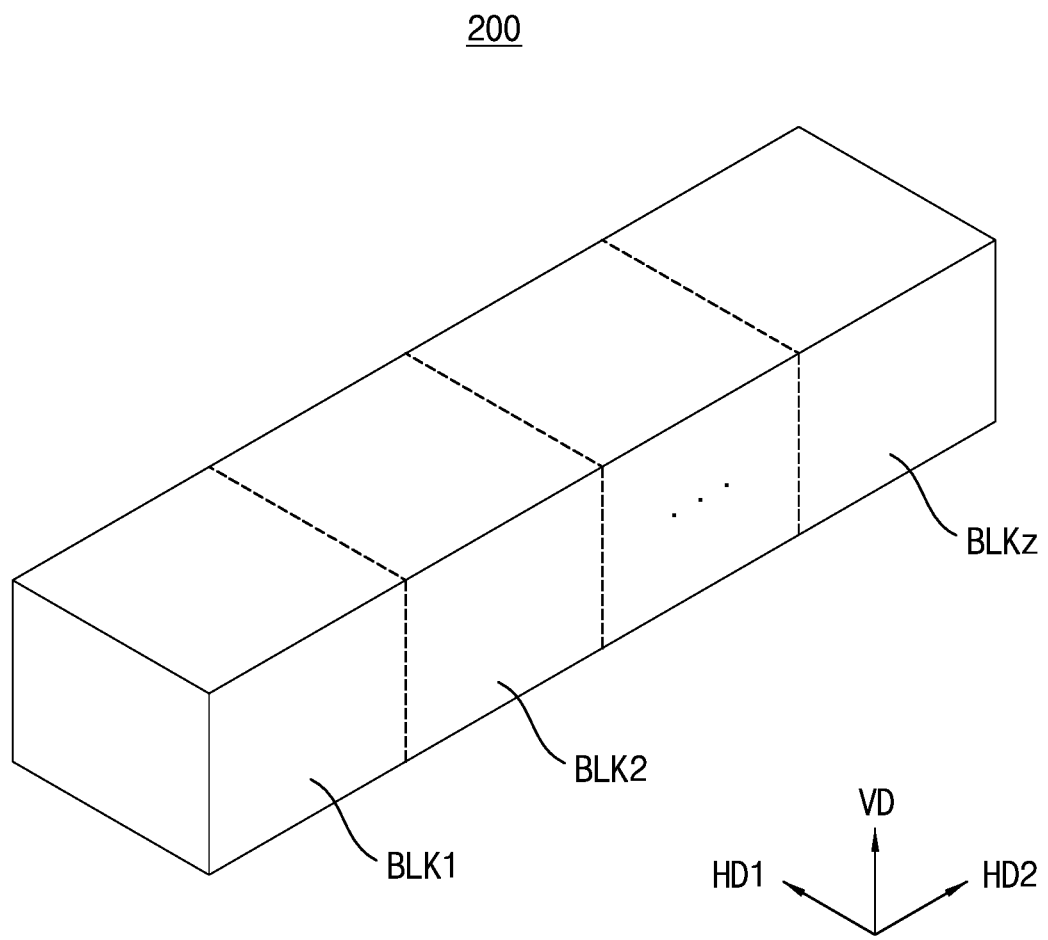
FIG. 10 is a block diagram illustrating an example of the memory cell array in FIG. 9 according to an example embodiment.

FIG. 10 is a block diagram illustrating an example of the memory cell array in FIG. 9 according to an example embodiment.

Referring to FIG. 10, the memory cell array 200 may include a plurality of memory blocks BLK1 to BLKz which extend along a first direction HD1 (i.e., a first horizontal direction), a second direction HD2 (i.e., a second horizontal direction) and a third direction VD (i.e., a vertical direction). Here, z may be a natural number greater than two. In an embodiment, the memory blocks BLK1 to BLKz are selected by the address decoder 430 in FIG. 9. For example, the address decoder 430 may select a memory block BLK corresponding to a block address among the memory blocks BLK1 to BLKz.

Figure 11:
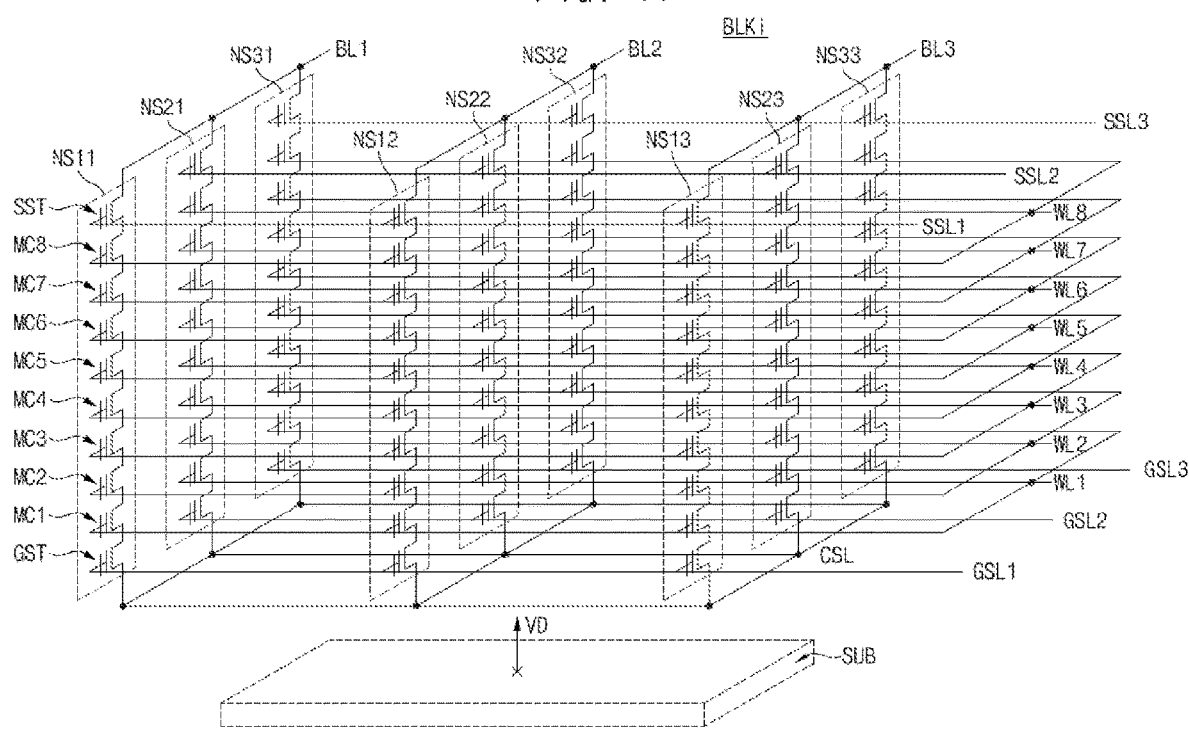
FIG. 11 is a circuit diagram illustrating one of the memory blocks of FIG. 10.

FIG. 11 is a circuit diagram illustrating one of the memory blocks of FIG. 10.

The memory block BLKi of FIG. 11 maybe formed on a substrate SUB in a three-dimensional structure (or a vertical structure). For example, a plurality of memory cell strings included in the memory block BLKi may be formed in the third direction VD perpendicular to the substrate SUB.

Referring to FIG. 11, the memory block BLKi may include (memory) cell strings NS11 to NS33 coupled between bit-lines BL1, BL2 and BL3 and a common source line CSL. Each of the cell strings NS11 to NS33 may include a string selection transistor SST, a plurality of memory cells MC1 to MC8, and a ground selection transistor GST. In FIG. 11, each of the cell strings NS11 to NS33 is illustrated to include eight memory cells MC1 to MC8. However, embodiments of present disclosure are not limited thereto. In some example embodiments, each of the cell strings NS11 to NS33 may include any number of memory cells.

The string selection transistor SST may be connected to corresponding string selection lines SSL1 to SSL3. The plurality of memory cells MC1 to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2 and BL3, and the ground selection transistor GST may be connected to the common source line CSL.

Word-lines (e.g., WL1) having the same height may be commonly connected, and the ground selection lines GSL1 to GSL3 and the string selection lines SSL1 to SSL3 may be separated.

Figure 12A:
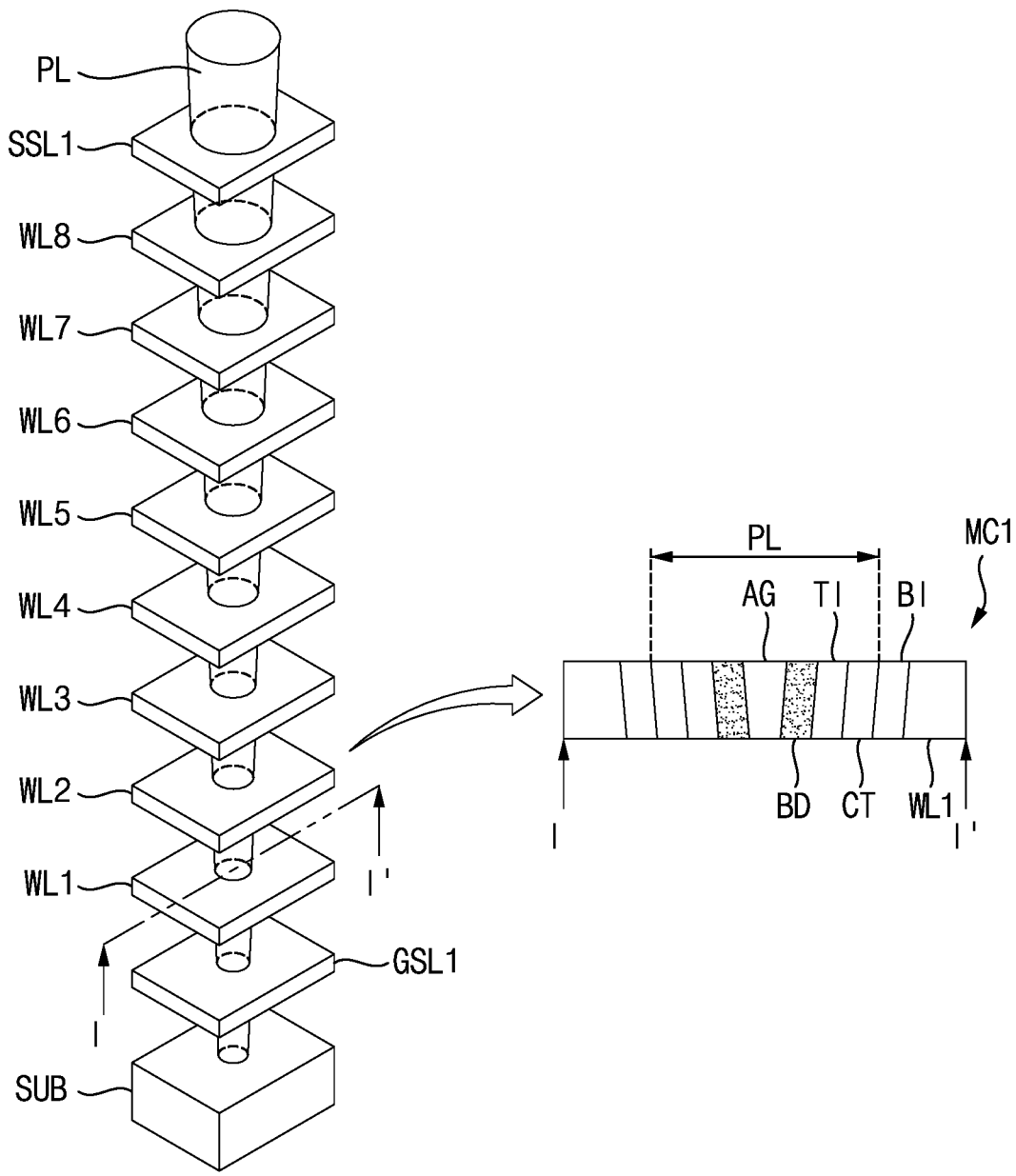
FIG. 12A illustrates an example of a structure of a cell string in the memory block of FIG. 11.

FIG. 12A illustrates an example of a structure of a cell string in the memory block of FIG. 11.

Referring to FIGS. 11 and 12A, in the cell string NS11, a pillar PL is provided on the substrate SUB such that the pillar PL extends in a direction perpendicular to the substrate SUB to make contact with the substrate SUB. Each of the ground selection line GSL, the word-lines WL1 to WL8, and the string selection lines SSL illustrated in FIG. 12A may be formed of a conductive material parallel with the substrate SUB, for example, a metallic material. The pillar PL may be in contact with the substrate SUB through the conductive materials forming the string selection lines SSL, the word-lines WL1 to WL8, and the ground selection line GSL.

A sectional view taken along a line I-I' is also illustrated in FIG. 12A. In some example embodiments, a sectional view of a first memory cell MC1 corresponding to a first word-line WL1 is illustrated. The pillar PL may include a cylindrical body BD. An air gap AG may be defined in the interior of the body BD.

The body BD may include P-type silicon and may be an area where a channel will be formed. The pillar PL may further include a cylindrical tunnel insulating layer TI surrounding the body BD and a cylindrical charge trap layer CT surrounding the tunnel insulating layer TI. A blocking insulating layer BI may be provided between the first word-line WL1 and the pillar PL. The body BD, the tunnel insulating layer TI, the charge trap layer CT, the blocking insulating layer BI, and the first word-line WL1 may constitute or be included in a charge trap type transistor that is formed in a direction perpendicular to the substrate SUB or to an upper surface of the substrate SUB. A string selection transistor SST, a ground selection transistor GST, and other memory cells may have the same structure as the first memory cell MC1.

Figure 12B:
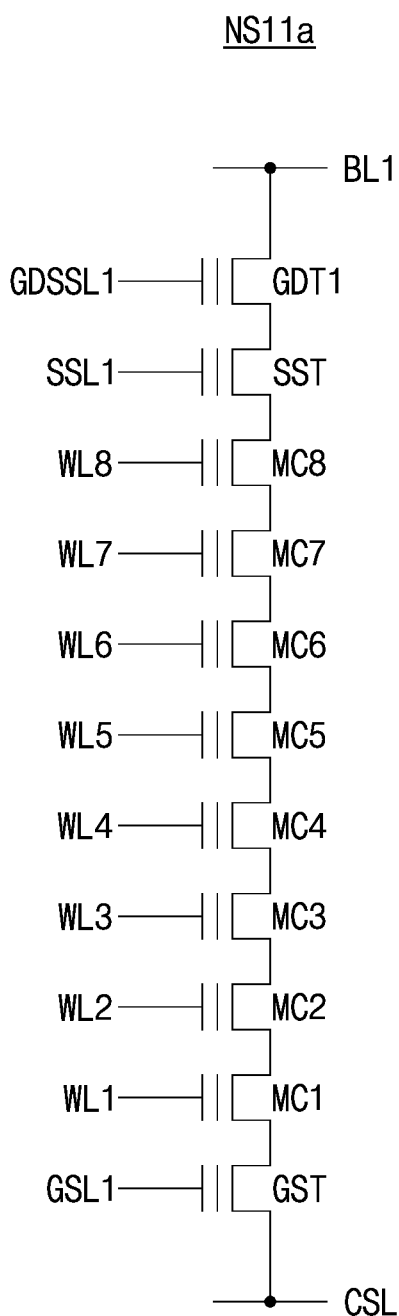
FIGS. 12B through 12D illustrate examples of one of cell strings in FIG. 12A, respectively, according to example embodiments.
Figure 12C:
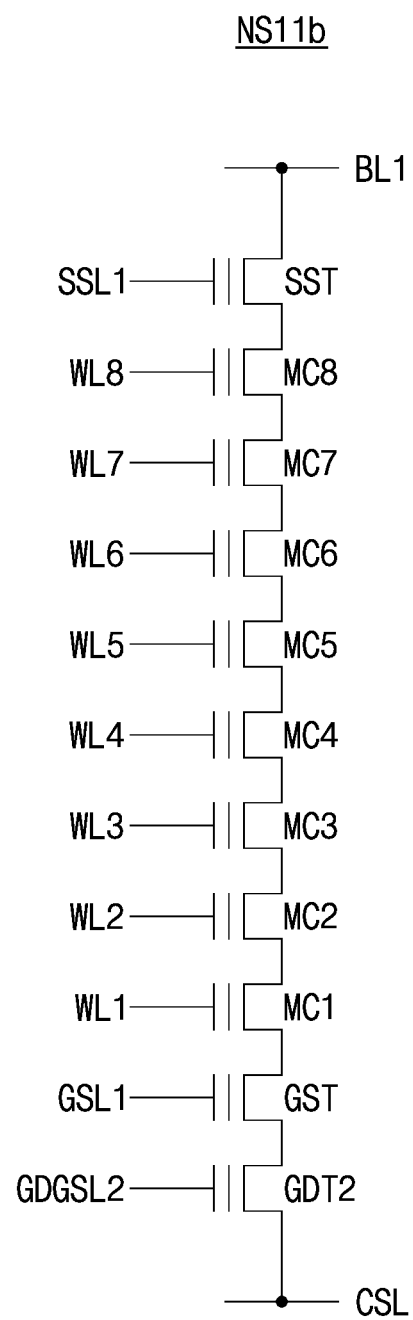
Figure 12D:
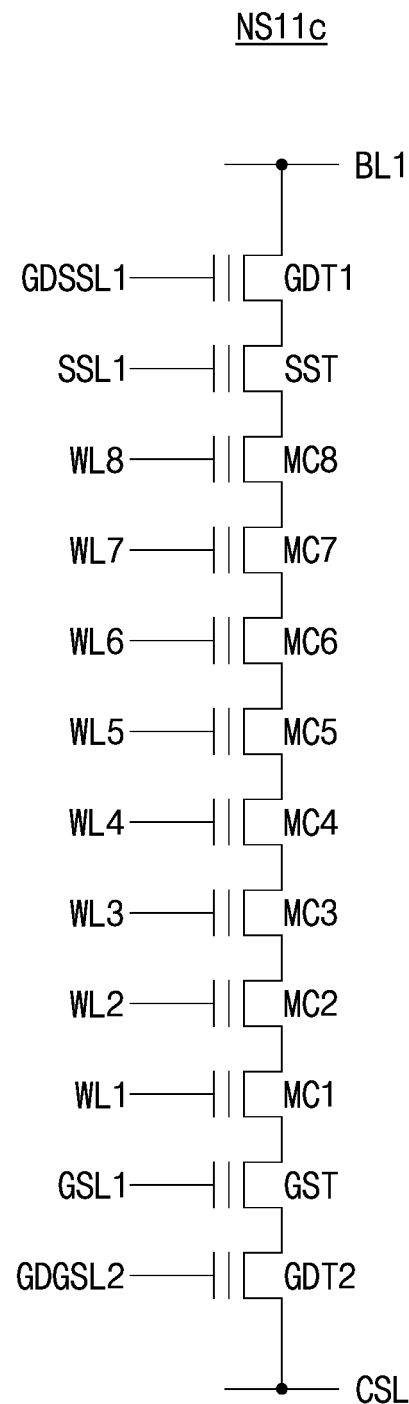

FIGS. 12B through 12D illustrate examples of one of the cell strings in FIG. 12A, respectively, according to example embodiments.

Referring to FIG. 12B, a cell string NS11a may include a ground selection transistor GST, a plurality of memory cells MC1 to MC8, a string selection transistor SST and a GIDL string selection transistor GDT1 connected in series between the common source line CSL and the bit-line BL1.

The GIDL string selection transistor GDT1 may be coupled to a GIDL string selection line GDSSL1. In this case, a uni-directional channel precharge may be performed in each of the cell strings during the bit-line set-up period PBLS, by applying a GIDL drain voltage to all or some of the plurality of bit-lines such that the GIDL drain voltage has a voltage level higher than a voltage difference between a GIDL threshold voltage and a GIDL on voltage during the bit-line set-up period PBLS. The GIDL on voltage correspond to a voltage having a level to turn-on the GIDL string selection transistor GDT1. Each of the memory cell strings NS11 to NS33 in FIG. 11 may employ the cell string NS11a of FIG. 12B.

Referring to FIG. 12C, a cell string NS11b may include a GIDL ground selection transistor GDT2, a ground selection transistor GST, a plurality of memory cells MC1 to MC8 and a string selection transistor SST connected in series between the common source line CSL and the bit-line BL1. The GIDL ground selection transistor GDT2 may be coupled to a GIDL ground selection line GDGSL2. In this case, a uni-directional channel precharge may be performed in each of the cell strings during the bit-line set-up period PBLS, by applying a GIDL drain voltage to the common source line CSL. Each of the memory cell strings NS11 to NS33 in FIG. 11 may employ the cell string NS11b of FIG. 12C.

Referring to FIG. 12D, a cell string NS11c may include a GIDL ground selection transistor GDT2, a ground selection transistor GST, a plurality of memory cells MC1 to MC8, a string selection transistor SST and a GIDL string selection transistor GDT1 connected in series between the common source line CSL and the bit-line BL1. The GIDL ground selection transistor GDT2 may be coupled to a GIDL ground selection line GDGSL2 and the GIDL string selection transistor GDT1 may be coupled to a GIDL string selection line GDSSL1. In this case, a bi-directional channel precharge may be performed in each of the cell strings during the bit-line set-up period PBLS, by applying the GIDL drain voltage to at least a portion of the plurality of bit-lines and applying the GIDL drain voltage to common the source line CSL. Each of the memory cell strings NS11 to NS33 in FIG. 11 may employ the cell string NS11c of FIG. 12D.

Figure 13:
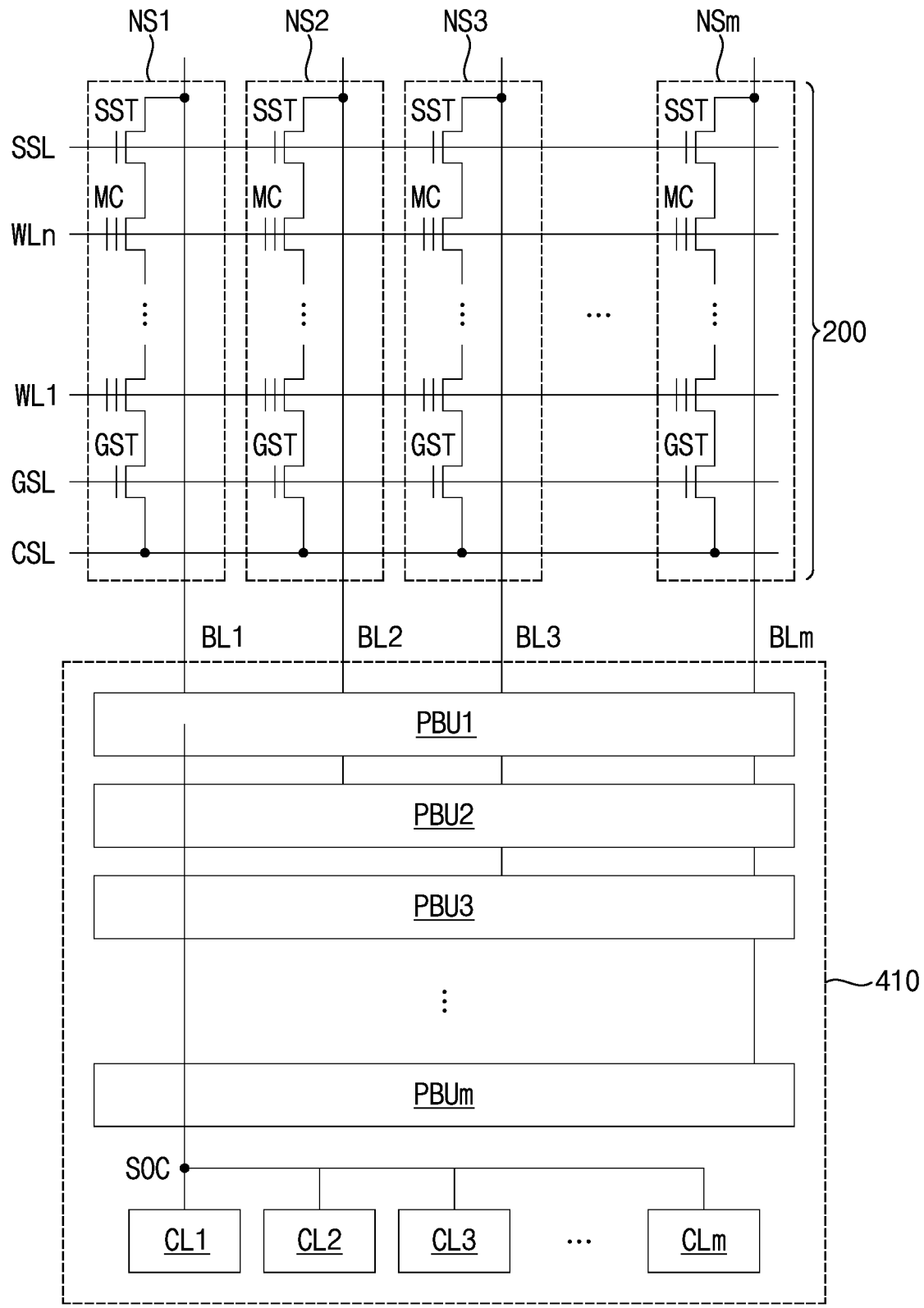
FIG. 13 is a schematic diagram of a connection of the memory cell array to the page buffer circuit in FIG. 9, according to an example embodiment.

FIG. 13 is a schematic diagram of a connection of the memory cell array to the page buffer circuit in FIG. 9, according to an example embodiment.

Referring to FIG. 13, the memory cell array 200 includes first through m-th cell strings NS1, NS2, NS3, ..., NSm, each of the first through m-th cell strings NS1, NS2, NS3, ..., NSm includes a ground select transistor GST connected to the ground select line GSL, a plurality of memory cells MC respectively connected to the first through n-th word-lines WL1, ..., WLn, and a string select transistor SST connected to the string select line SSL. The ground select transistor GST, the plurality of memory cells MC, and the string select transistor SST may be connected to each other in series. In this case, n may be a positive integer greater than three.

The page buffer circuit 410 includes first through m-th page buffer units PBU1, PBU2, PBU3, ..., PBUm. The first page buffer unit PB1 may be connected to the first cell string NS1 via the first bit-line BL1, and the m-th page buffer unit PBUm may be connected to the m-th cell string NSm via the m-th bit-line BLm. For example, m may be 8, and the page buffer circuit 410 may have a structure in which page buffer units of eight stages, or, the first through m-th page buffer units PBU1, PBU2, PBU3, ..., PBUm are in a line. For example, the first through m-th page buffer units PBU1, PBU2, PBU3, ..., PBUm may be arranged in a row in an extension direction of the first through m-th bit-lines BL1, BL2, BL3, ..., BLm.

The page buffer circuit 410 may further include first through m-th cache latches CL1, CL2, CL3, ..., CLm respectively corresponding to the first through m-th page buffer units PBU1, PBU2, PBU3, ..., PBUm. For example, the page buffer circuit 410 may have a structure in which the cache latches of eight stages or the first through m-th cache latches CL1, CL2, CL3, ..., CLm are arranged in a line. For example, the first through m-th cache latches CL1, CL2, CL3, ..., CLm may be arranged in a row in an extension direction of the first through m-th bit-lines BL1, BL2, BL3, ..., BLm.

The sensing nodes of each of the first through m-th page buffer units PBU1, PBU2, PBU3, ..., PBUm may be commonly connected to a combined sensing node SOC. In addition, the first through m-th cache latches CL1, CL2, CL3, . . . , CLm may be commonly connected to the combined sensing node SOC. Accordingly, the first through m-th page buffer units BU1, PBU2, PBU3, . . . , PBUm may be connected to the first through m-th cache latches CL1, CL2, CL3, . . . , CLm via the combined sensing node SOC.

Figure 14:
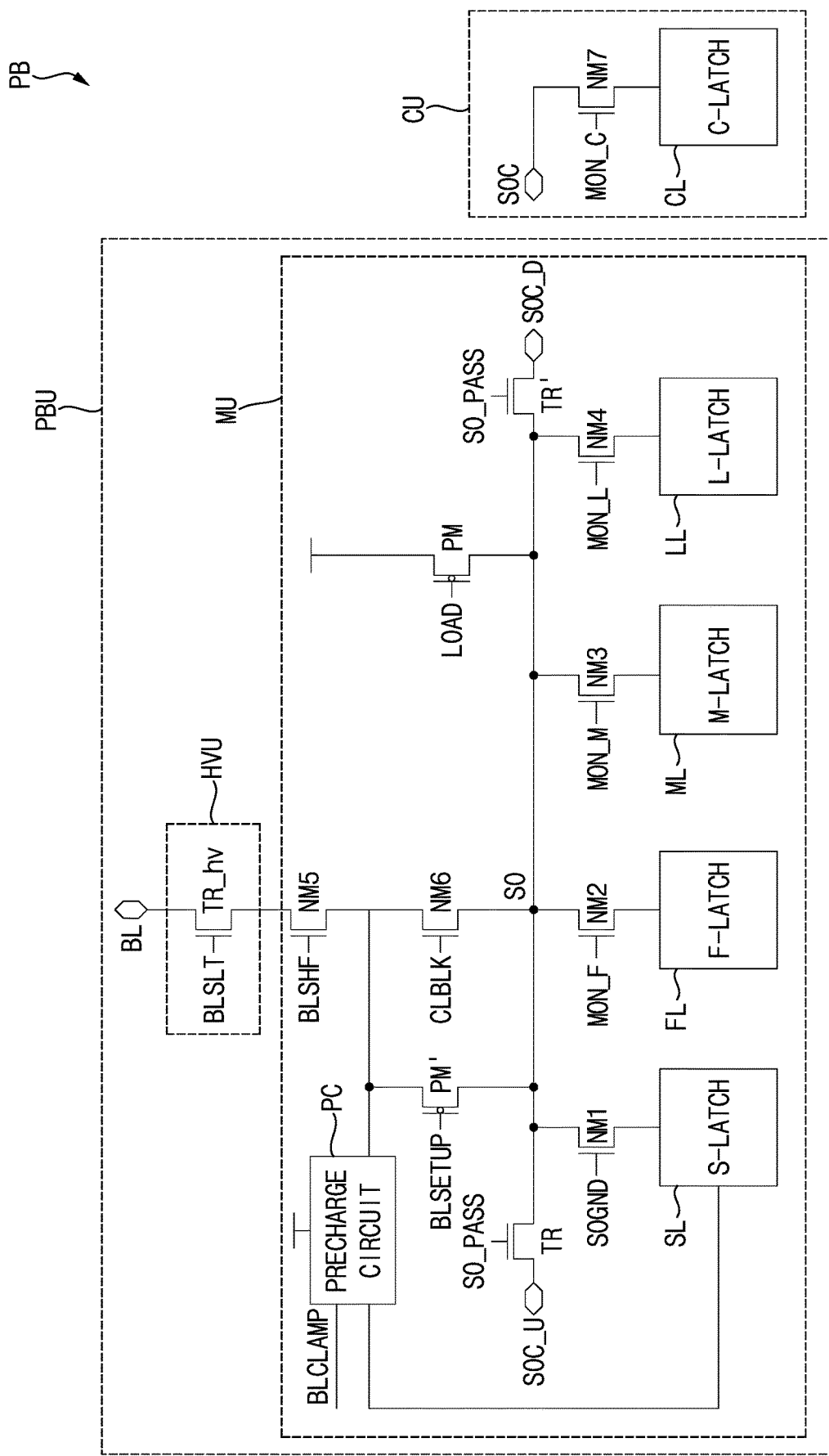
FIG. 14 illustrates a page buffer in detail according to an example embodiment.

FIG. 14 illustrates a page buffer in detail according to an example embodiment.

Referring to FIG. 14, the page buffer PB may correspond to an example of the page buffer circuit 410 in FIG. 9. The page buffer PB may include a page buffer unit PBU and a cache unit CU. Because the cache unit CU includes a cache latch (C-LATCH) CL, and the C-LATCH CL is connected to a data input/output line, the cache unit CU may be adjacent to the data input/output line. The page buffer unit PBU and the cache unit CU may be spaced apart from each other, and the page buffer PB may have a structure in which the page buffer unit PBU and the cache unit CU are spaced apart from each other.

The page buffer unit PBU may include a main unit MU. The main unit MU may include main transistors in the page buffer PB. The page buffer unit PBU may further include a bit-line selection transistor TR_hv that is connected to the bit-line BL and driven by a bit-line selection signal BLSLT. The bit-line select transistor TR_hv may include or be a high voltage transistor, and accordingly, the bit-line selection transistor TR_hv may be in a different well region from the main unit MU, that is, in a high voltage unit HVU.

The main unit MU may include a sensing latch (S-LATCH) SL, a force latch (F-LATCH) FL, an upper bit latch (M-LATCH) ML and a lower bit latch (L-LATCH) LL. According to an embodiment, the S-LATCH SL, the F-LATCH FL, the M-LATCH ML, or the L-LATCH LL may be referred to as main latches. The main unit MU may further include a precharge circuit PC capable of controlling a precharge operation on the bit-line BL or a sensing node SO based on a bit-line clamping control signal BLCLAMP, and may further include a transistor PM' driven by a bit-line setup signal BLSETUP.

The S-LATCH SL may during a read or program verification operation, store data stored in a memory cell MC or a sensing result of a threshold voltage of the memory cell MC. In addition, the S-LATCH SL may during a program operation, be used to apply a program bit-line voltage or a program inhibit voltage to the bit-line BL. The F-LATCH FL may be used to optimize threshold voltage distribution during the program operation. The F-LATCH FL may store force data. After the force data is initially set to '1', the force data may be converted to '0' when the threshold voltage of the memory cell MC enters a forcing region that has a voltage lower than a target region. By utilizing the force data during a program execution operation, the bit-line voltage may be controlled, and the program threshold voltage distribution may be formed narrower.

The M-LATCH ML, the L-LATCH LL, and the C-LATCH CL may be utilized to store data externally input during the program operation, and may be referred to as data latches. When data of 3 bits is programmed in one memory cell MC, the data of 3 bits may be stored in the M-LATCH ML, the L-LATCH LL, and the C-LATCH CL, respectively. Until a program of the memory cell MC has completed, the M-LATCH ML, the L-LATCH LL, and the C-LATCH CL may maintain the stored data. In addition, the C-LATCH CL may receive data read from a memory cell MC during the read operation from the S-LATCH SL, and output the received data to the outside via the data input/output line.

In addition, the main unit MU may further include first through fourth transistors NM1 through NM4. The first transistor NM1 may be connected between the sensing node SO and the S-LATCH SL, and may be driven by a ground control signal SOGND. The second transistor NM2 may be connected between the sensing node SO and the F-LATCH FL, and may be driven by a forcing monitoring signal MON_F. The third transistor NM3 may be connected between the sensing node SO and the M-LATCH ML, and may be driven by a higher bit monitoring signal MON_M. The fourth transistor NM4 may be connected between the sensing node SO and the L-LATCH LL, and may be driven by a lower bit monitoring signal MON_L.

In addition, the main unit MU may further include fifth and sixth transistors NM5 and NM6 connected to each other in series between the bit-line selection transistor TV_hv and the sensing node SO. The fifth transistor NM5 may be driven by a bit-line shut-off signal BLSHF, and the sixth transistor NM6 may be driven by a bit-line connection control signal CLBLK. In addition, the main unit MU may further include a precharge transistor PM. The precharge transistor PM may be connected to the sensing node SO, driven by a load signal LOAD, and precharge the sensing node SO to a precharge level in a precharge period.

In an embodiment, the main unit MU may further include a pair of pass transistors connected to the sensing node SO, or first and second pass transistors TR and TR'. According to an embodiment, the first and second pass transistors TR and TR' may also be referred to as first and second sensing node connection transistors, respectively. The first and second pass transistors TR and TR' maybe driven in response to a pass control signal SO_PASS. According to an embodiment, the pass control signal SO_PASS may be referred to as a sensing node connection control signal. The first pass transistor TR may be connected between a first terminal SOC_U and the sensing node SO, and the second pass transistor TR' maybe connected between the sensing node SO and a second terminal SOC_D.

For example, when the page buffer unit PBU corresponds to the second page buffer unit PBU2 in FIG. 7, the first terminal SOC_U may be connected to one end of the pass transistor included in the first page buffer unit PBU1, and the second terminal SOC_D may be connected to one end of the pass transistor included in the third page buffer unit PBU3. In this manner, the sensing node SO may be electrically connected to the combined sensing node SOC via pass transistors included in each of the third through m-th page buffer units PBU3 through PBUM.

During the program operation, the page buffer PB may verify whether the program has completed in a memory cell MC selected among the memory cells MC included in the NAND string connected to the bit-line BL. The page buffer PB may store data sensed via the bit-line BL during the program verify operation in the S-LATCH SL. The M-LATCH ML and the L-LATCH LL may be set in which target data is stored according to the sensed data stored in the S-LATCH SL.

For example, when the sensed data indicates that the program has completed, the M-LATCH ML and the L-LATCH LL may be switched to a program inhibit setup for the selected memory cell MC in a subsequent program loop. The C-LATCH CL may temporarily store input data provided from the outside. During the program operation, the target data to be stored in the C-LATCH CL may be stored in the M-LATCH ML and the L-LATCH LL.

Hereinafter, it is assumed that signals for controlling elements in the page buffer circuit 410 are included in the page buffer control signal PCTL in FIG. 9.

Figure 15:
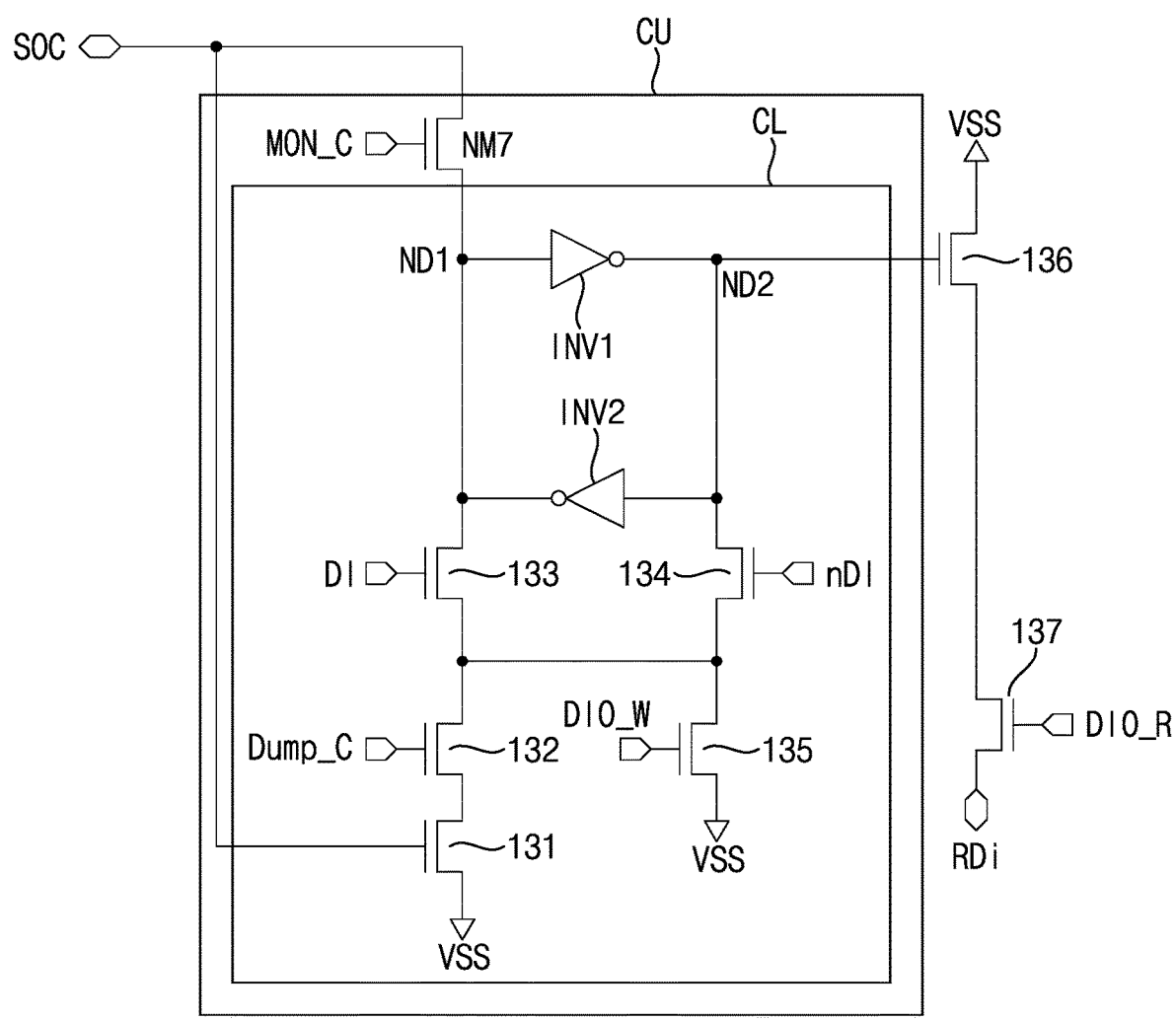
FIG. 15 is a circuit diagram illustrating an example of the cache unit according to an example embodiment.

FIG. 15 is a circuit diagram illustrating an example of the cache unit according to an example embodiment.

Referring to FIGS. 14 and 15, the cache unit CU may include the monitor transistor NM7 and the C-LATCH CL, and the C-LATCH CL may include first and second inverters INV1 and INV2, a dump transistor 132, and transistors 131, 133 to 135. The monitor transistor NM7 may be driven based on the cache monitoring signal MON_C, and may control a connection between the coupling sensing node SOC and the C-LATCH CL.

The first inverter INV1 may be connected between the first node ND1 and the second node ND2, the second inverter INV2 may be connected between the second node ND2 and the first node ND1. Thus, the first and second inverters INV1 and INV2 may form a latch. The transistor 131 may include a gate connected to the combined sensing node SOC and may be connected between the dump transistor 132 and a ground voltage VSS.

The dump transistor 132 may be driven by a dump signal Dump_C, and may transmit data stored in the C-LATCH CL to a main latch, for example, the S-LATCH SL in the page buffer unit PBU. The transistor 133 may be driven by a data signal DI. A transistor 134 may be driven by a data inversion signal Ndi. The transistor 135 may be driven by a write control signal DIO_W. When the write control signal DIO_W is activated, voltage levels of the first and second nodes ND1 and ND2 may be determined based on the data signal DI and the data inversion signal nDI, respectively.

The cache unit CU may be connected to an data I/O line (or data I/O terminal) RDi via transistors 136 and 137. The transistor 136 may include a gate connected to the second node ND2, and may be turned on or off based on a voltage level of the second node ND2. The transistor 137 may be driven by a read control signal DIO_R. When the read control signal DIO_R is activated and the transistor 137 is turned on, a voltage level of the input/output terminal RDi may be determined as '1' or '0' based on a state of the C-LATCH CL.

Figure 16:
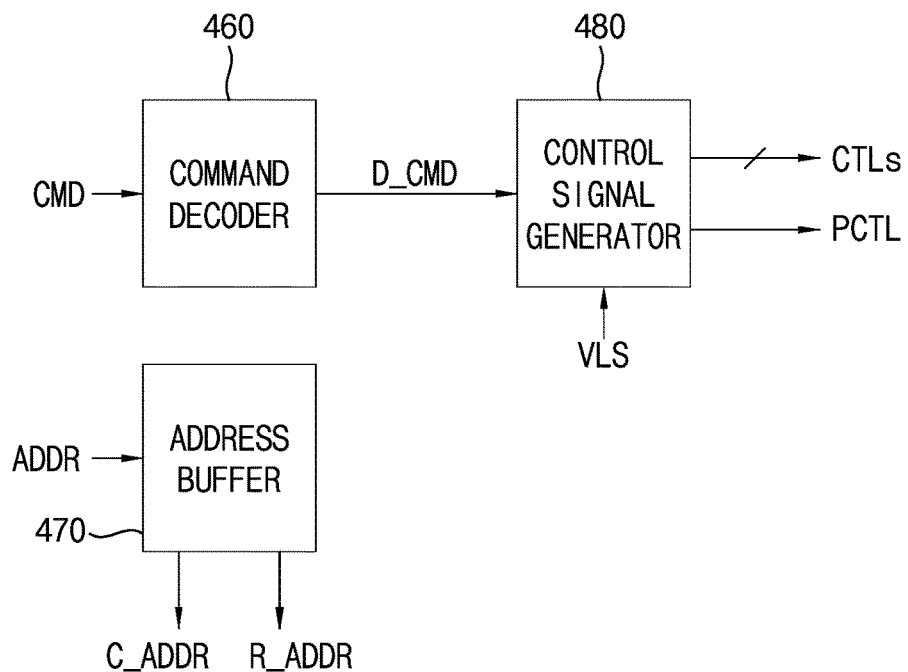
FIG. 16 is a block diagram illustrating the control circuit in the nonvolatile memory device of FIG. 9 according to an example embodiment.

FIG. 16 is a block diagram illustrating the control circuit in the nonvolatile memory device of FIG. 9 according to an example embodiment.

Referring to FIG. 16, the control circuit 450 includes a command decoder 460 (e.g., a decoder circuit), an address buffer 470 and a control signal generator 480.

The command decoder 460 decodes the command CMD to generate decoded command D_CMD and provides the decoded command D_CMD to the control signal generator 480.

The address buffer 470 receives the address signal ADDR to generate a row address R_ADDR and a column address C_ADDR, provides the row address R_ADDR to the address decoder 430 and provides the column address C_ADDR to the data input/output circuit 420.

The control signal generator 480 receives the decoded command D_CMD and the voltage level signal VLS, generates the control signals CTLs based on an operation directed by the decoded command D_CMD and the voltage level of the program pass voltage directed by the voltage level signal VLS, provides the control signals CTLs to the voltage generator 500, generates the page buffer control signal PCTL and provides the page buffer control signal PCTL to the page buffer circuit 410.

Figure 17:
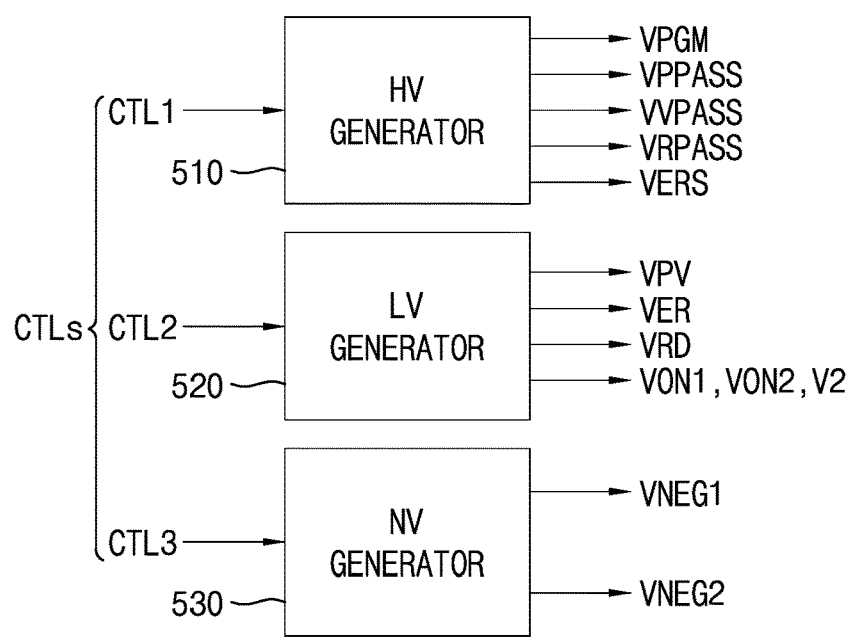
FIG. 17 is a block diagram illustrating the voltage generator in the nonvolatile memory device of FIG. 9 according to an example embodiment.

FIG. 17 is a block diagram illustrating the voltage generator in the nonvolatile memory device of FIG. 9 according to an example embodiment.

Referring to FIG. 17, the voltage generator 500 includes a high voltage (HV) generator 510 and a low voltage (HV) generator 520. The voltage generator 500 may further include a negative voltage (NV) generator 530.

The high voltage generator 510 may generate a program voltage VPGM, a program pass voltage VPPASS, a verification pass voltage VVPASS, a read pass voltage VRPASS and an erase voltage VERS according to operations directed by the command CMD, in response to a first control signal CTL1.

The program voltage VPGM is applied to the selected word-line, the program pass voltage VPPASS, the verification pass voltage VVPASS, the read pass voltage VRPASS may be applied to the unselected word-lines and the erase voltage VERS may be applied to the well of the memory block. The first control signal CTL1 may include a plurality of bits which indicate the operations directed by the decoded command D_CMD.

The low voltage generator 520 may generate a program verification voltage VPV, an erase verification voltage VER, a read voltage VRD, a first turn-on voltage VON1, a second turn-on voltage VON2 and a second voltage V2 according to operations directed by the command CMD, in response to a second control signal CTL2. The program verification voltage VPV, the read voltage VRD, and erase verification voltage VER may be applied to the selected word-line according to operation of the nonvolatile memory device 200. The first turn-on voltage VON1 and the second turn-on voltage VON2 may be applied to a string selection transistor and a ground selection transistor of each of the selected cell string and the unselected cell string. The second control signal CTL2 may include a plurality of bits which indicate the operations directed by the decoded command D_CMD.

The negative voltage generator 530 may generate a first negative voltage VNEG1 and a second negative voltage VNEG2 which have negative levels according to operations directed by the command CMD, in response to a third control signal CTL3. The third control signal CTL3 may include a plurality of bits which indicate the operations directed by the decoded command D_CMD. The first negative voltage VNEG1 may be applied to a selected word-line and unselected word-lines during the program recovery period and the second negative voltage VNEG2 may be applied to the unselected word-lines during the bit-line set-up period.

Figure 18:
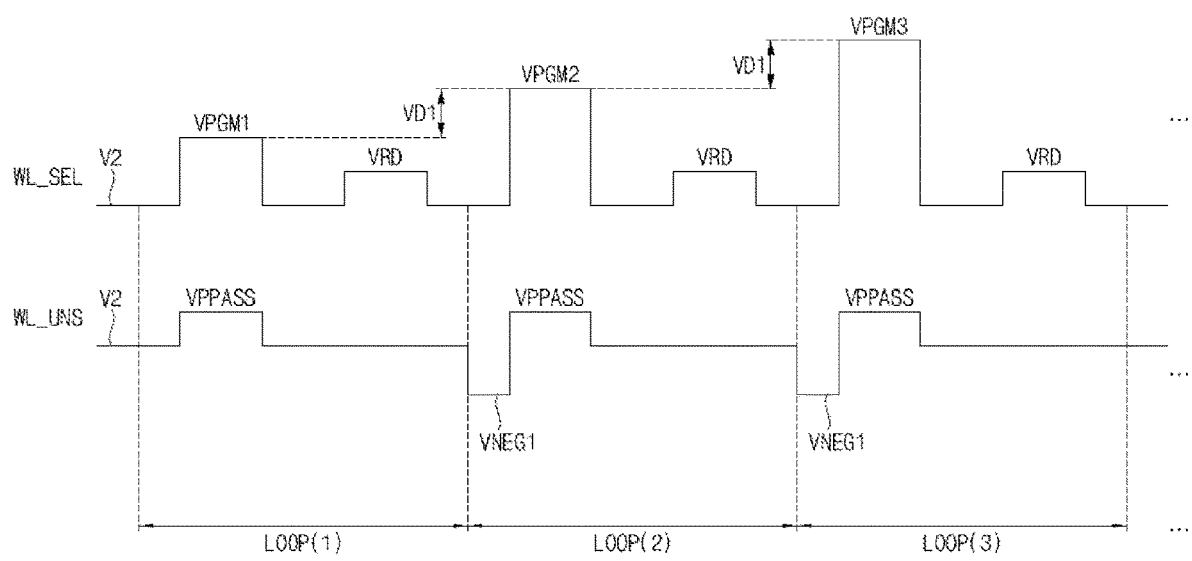
FIG. 18 is a diagram a plurality of program loops for an incremental step pulse programming.
Figure 19:
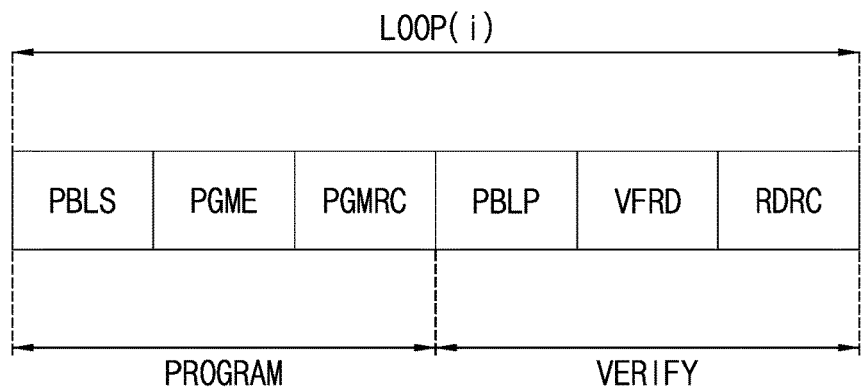
FIG. 19 is a diagram illustrating operation periods included in each of the program loops in FIG. 18.

FIG. 18 is a diagram a plurality of program loops for an incremental step pulse programming (ISPP), and FIG. 19 is a diagram illustrating operation periods included in each of the program loops in FIG. 18.

Referring to FIGS. 18 and 19, a plurality of program loops LOOP(1), LOOP(2) and LOOP(3) are performed sequentially according to ISPP until the program operation has completed. When the program loops are repeated, the program voltages VPGM1, VPGM2 and VPGM3 may be increased step-wisely. The program voltages VPGM1, VPGM2 and VPGM3 may be increased step-wisely by a first voltage difference (i.e., a gap) VD1 as a number of the program loops increases. In addition, when the program loops are repeated, the first negative voltage VNEG1 applied to the unselected word-line during the bit-line set-up period may be maintained.

Each program loop LOOP(i) may include a program period PROGRAM to apply each of the program voltages VPGM1, VPGM2 and VPGM3 to a selected word-line for programming the selected memory cells and a verification period VERIFY to apply a verification read voltage VPV to the selected word-line for verifying the success of the program operation.

The program period PROGRAM may include the bit-line set-up period PBLS, a program execution period PGME and a program recovery period PGMRC. The verification period VERIFY may include a bit-line precharge period PBLP, a verification read period VFRD and a read recovery period RDRC. The bit-line set-up period PBLS, the program execution period PGME, the program recovery period PGMRC and the verification read period VFRD are the same as described with reference to FIG. 2.

Figure 20A:
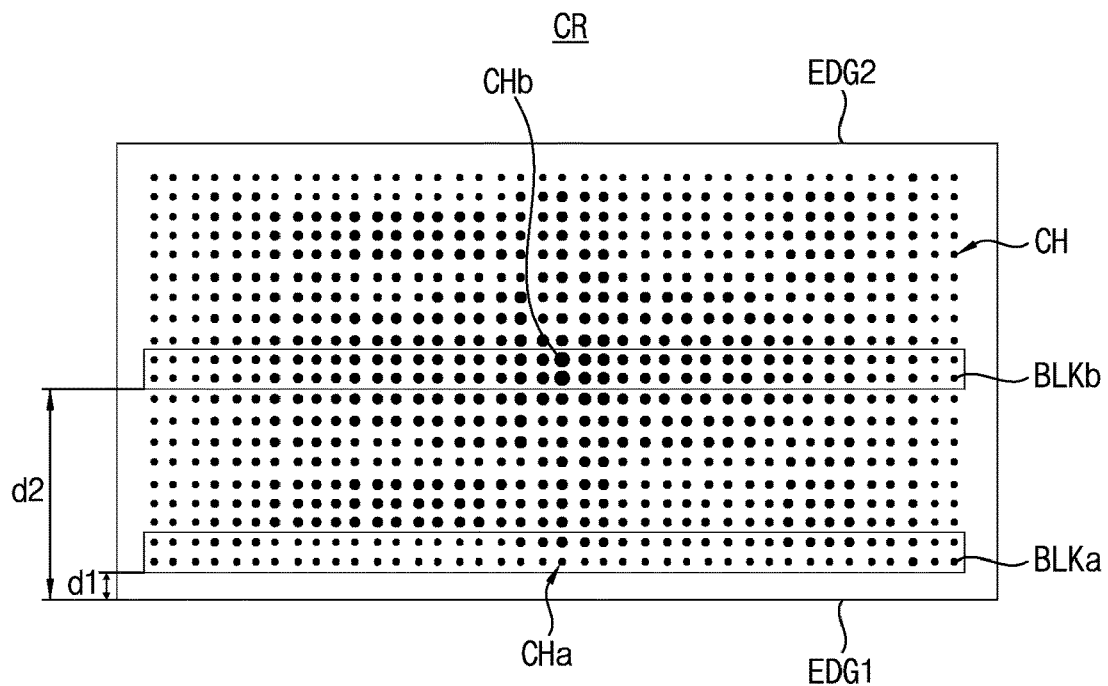
FIG. 20A is a plan view of an example of a cell region in which the memory block of FIG. 11 is formed.

FIG. 20A is a plan view of an example of a cell region in which the memory block of FIG. 11 is formed.

Referring to FIG. 20A, a cell region CR may include a plurality of channel holes CH.

A channel hole size of one of the channel holes CH, for example, a channel hole diameter, may vary according to positions within the cell region CR. For example, portions adjacent to first and second edges EDG1 and EDG2 in the second direction HD2 may have a relatively low peripheral density, and thus channel holes CHa adjacent to the first and second edges EDG1 and EDG2 may have different diameters from those of the other channel holes CH. Channel holes CHb located in a center of the cell region CR may have diameters larger than those of the channel holes CHa adjacent to the first and second edges EDG1 and EDG2. A memory block BLKa may be adjacent to the second edge EDG2, and may be spaced apart from the second edge EDG2 by a first distance d1. The memory block BLKb is not adjacent to the first and second edges EDG1 and EDG2, may be in the center of the cell region CR, and may be spaced apart from the second edge EDG2 by a second distance d2. In an embodiment, the second distance d2 is greater than the first distance d1. In an embodiment, a first diameter of the channel hole CHa included in the memory block BLKa is smaller than a second diameter of the channel hole CHb included in the memory block BLKb.

Figure 20B:
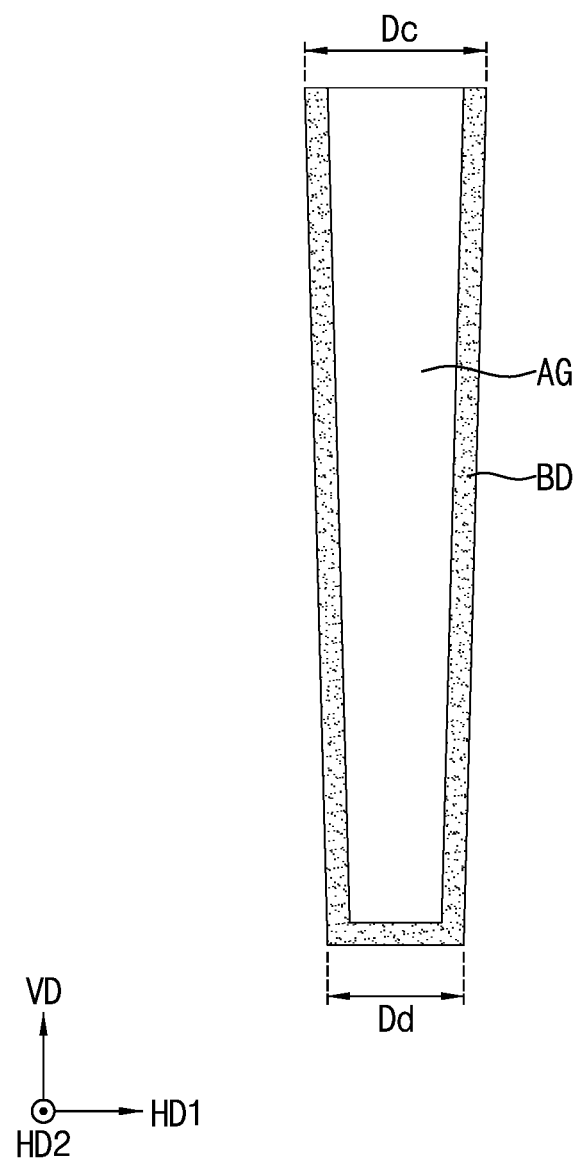
FIG. 20B is a cross-sectional view of an example of a channel hole formed in a cell region of FIG. 20A.

FIG. 20B is a cross-sectional view of an example of a channel hole formed in a cell region of FIG. 20A.

Referring to FIG. 20B, a pillar including a body BD and an air gap AG may be formed in a channel hole CHc. For example, the channel hole CHc may be drilled from the top to the bottom, and a diameter Dc on a position where the formation of the channel hole CHc starts (e.g., on the top) may be larger than a diameter Dd on a position where the formation of the channel hole CHc ends (e.g., on the bottom). For example, the channel hole CHc may be included in one memory block.

As described above, the diameter of the channel hole may vary depending on the position in the cell region CR, and the diameter of the channel hole may also vary depending on the third direction VD even within one channel hole. Due to the difference in the channel hole diameter (e.g., size), a program time interval associated with memory cells and pages may differ. That is, the program time interval of the memory cells coupled to a selected word-line may differ according to a distance of the selected word-line from the common source line in the third direction VD.

The control circuit 450 in FIG. 9 may adjust the set-up timing of the target bit-lines corresponding to the plurality of groups based on a distance of the selected word-line from the common source line in the third direction VD.

Figure 21:
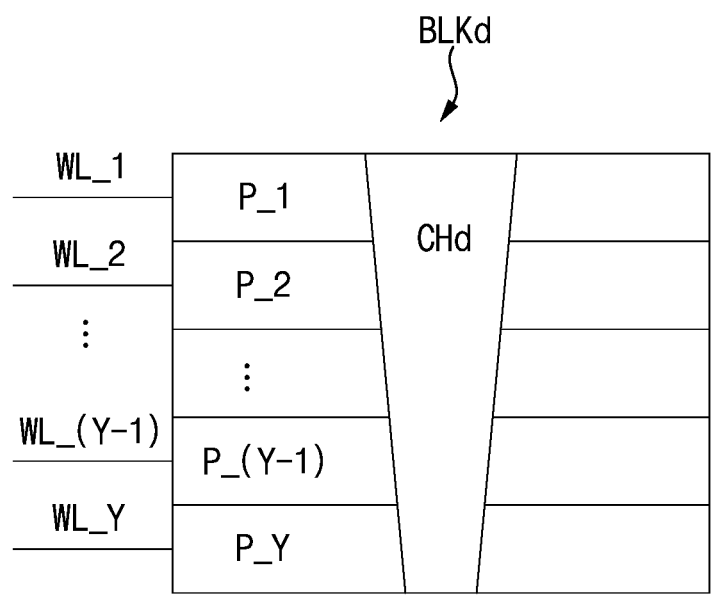
FIG. 21 is a diagram for describing pages included in a nonvolatile memory device according to an example embodiment.

FIG. 21 is a diagram for describing pages included in a nonvolatile memory device according to an example embodiment.

Referring to FIG. 21, an example of pages P_1, P_2, . . . , P_(Y−1), P_Y included in a vertical (or three-dimensional) memory cell array is illustrated, where Y is a natural number greater than or equal to four.

The pages P_1 to P_Y may be included in a memory block BLKd, and may be sequentially arranged along a vertical direction, e.g., along a first channel hole CHd included in the first memory block BLK1. In addition, the pages P_1 to P_Y may be connected to word-lines WL_1, WL_2, . . . , WL_(Y−1), WL_Y, respectively.

A length of a channel hole corresponding to a selected word-line from among the word-lines WL_1, WL_2, . . . , WL_(Y−1), WL_Y may differ depending on a location of the selected word-line in the vertical direction (VD in FIG. 20B).

Figure 22:
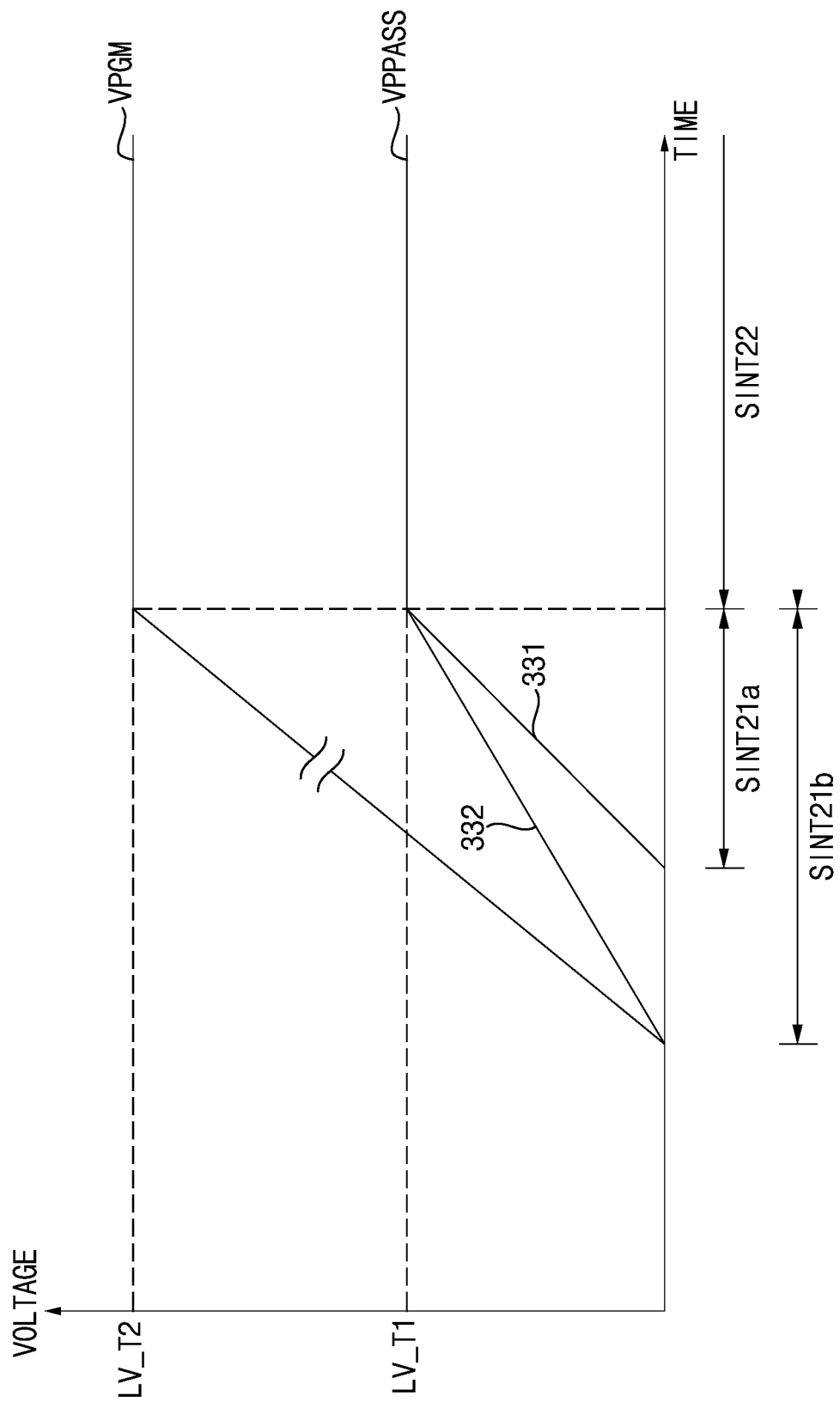
FIG. 22 illustrates an example that the control circuit in FIG. 9 adjusts a ramping slope of the program pass voltage based on a number of the plurality of states of a program data according to an example embodiment.

FIG. 22 illustrates an example where the control circuit in FIG. 9 adjusts a ramping slope of the program pass voltage based on a number of the plurality of states of a program data according to an example embodiment.

In FIG. 22, a reference numeral 331 represents a ramping slope of the program pass voltage VPPASS when the program data to be stored in memory cells has a first number of states (e.g., when each of the memory cells is a TLC) and a reference numeral 332 represents a ramping slope of the program pass voltage VPPASS when the program data to be stored in memory cells has a second number of states (e.g., when each of the memory cells is a QLC). The second number is greater than the first number.

In an embodiment, a time interval of a first sub period SINT21b associated with a case when the program data has the second number of states is greater than a time interval of a first sub period SINT21a associated with a case when the program data has the first number of states. That is, the control circuit 450 in FIG. 9 may adjust a number of groups based on a number of states of the program data and may reduce a ramping slope of the program pass voltage VPPASS in the first sub period in response to a number of the groups increasing. During a second sub period SINT22, the program pass voltage VPPASS may have a first target level LV_T1 and the program voltage VPGM may have a second target level LV_T2.

Figure 23A:
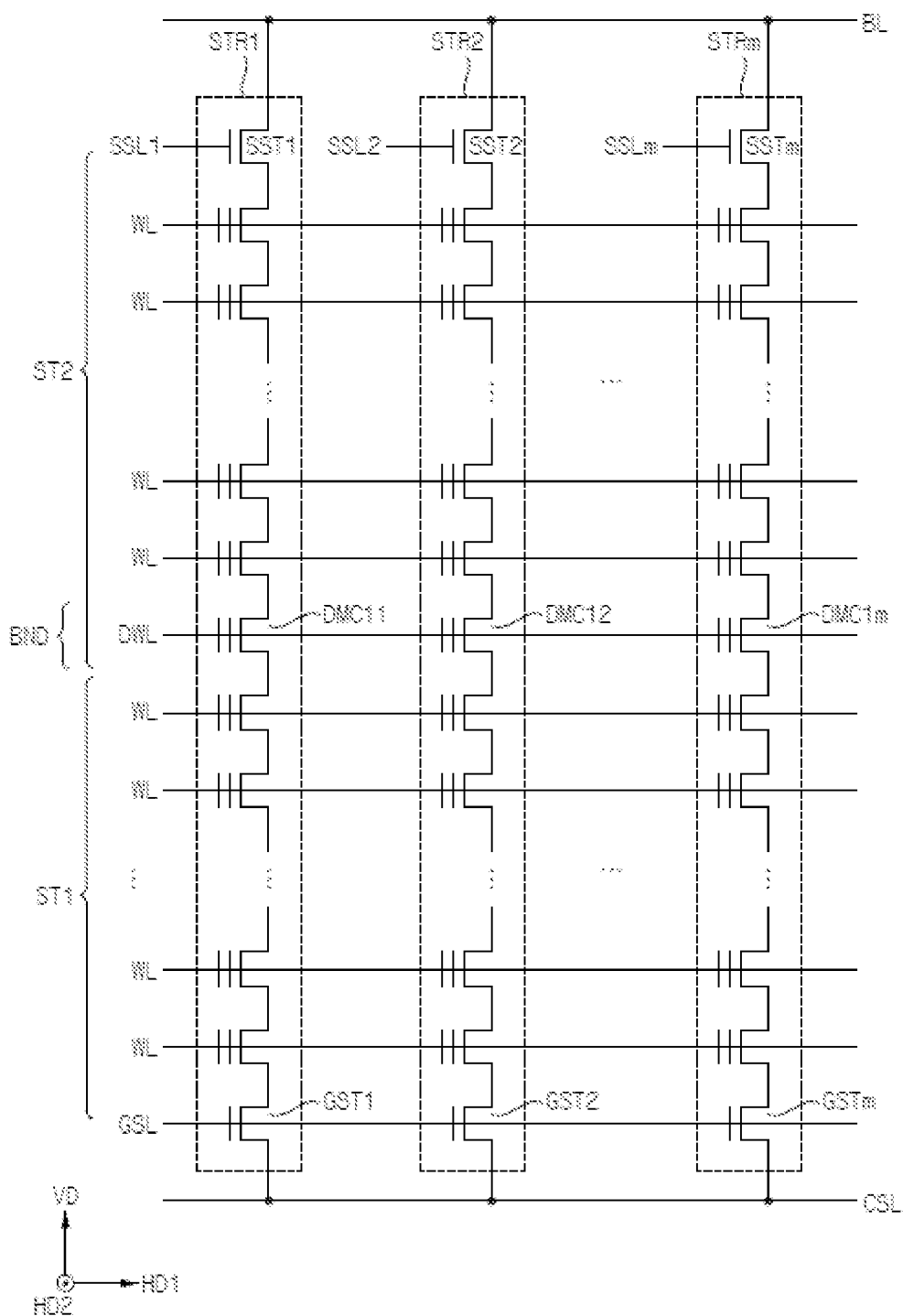
FIG. 23A is a circuit diagram illustrating a structure of a memory cell array according to an example embodiment.
Figure 23B:
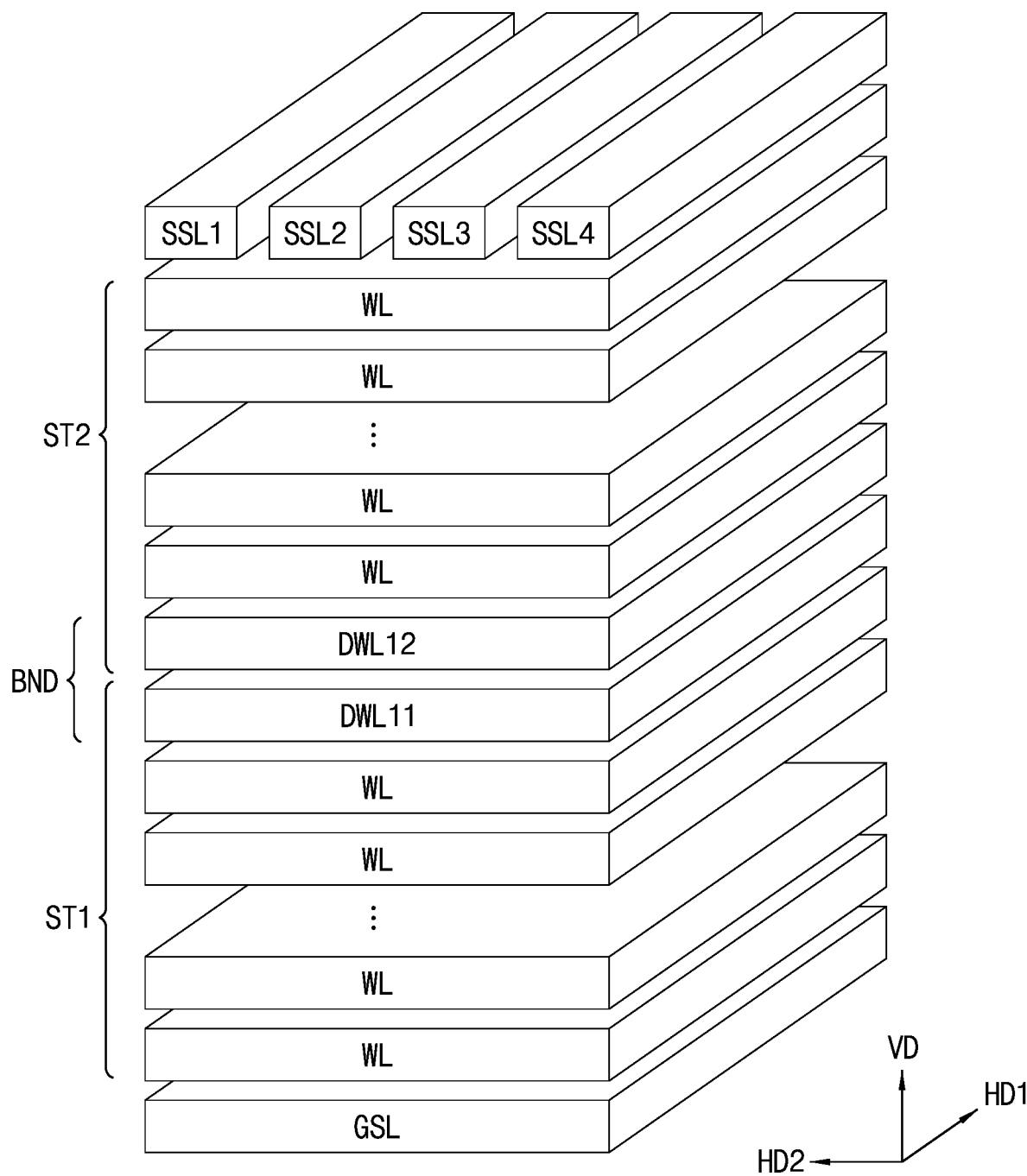
FIG. 23B is a perspective view illustrating a memory block corresponding to a structure of FIG. 23A.

FIG. 23A is a circuit diagram illustrating a structure of a memory cell array according to example embodiments, and FIG. 23B is a perspective view illustrating a memory block corresponding to a structure of FIG. 23A.

FIG. 23A illustrates a memory block including cell strings connected to one bit-line BL and one common source line CSL for convenience of illustration, but it should be understood that the memory block may have a three-dimensional structure of a plurality of bit-lines as described with reference to FIGS. 10 and 11.

Referring to FIGS. 23A and 23B, a memory block may include a plurality of cell strings STR1, STR2, . . . , STRm connected between a bit-line BL and a common source line CSL. The cell strings STR1, STR2, . . . , STRm may include string selection transistors SST1, SST2, . . . , SSTm controlled by string selection lines SSL1, SSL2, . . . , SSLm, memory cells controlled by word-lines WL, dummy memory cells DMC11, DMC12, . . . , DMC1m controlled by a dummy word-line and ground selection transistors GST1, GST2, . . . , GSTm controlled by a ground selection line GSL, respectively. The plurality of cell strings STR1, STR2, . . . , STRm may be divided into a first stack ST1 and a second stack ST2 along the vertical direction VD. The second stack ST2 is disposed at a higher position than the first stack ST1 in the vertical direction VD. Memory cells coupled to at least one word-line located at an edge of each of the first stack ST1 and the second stack ST2 may be dummy memory cells. The dummy memory cells does not store valid data or may store smaller bits of data than other memory cells.

The dummy memory cells DMC11, DMC12, . . . , DMC1m may be included in the second stack ST1.

FIG. 23A illustrates an example embodiment that the ground selection transistors GST1, GST2, . . . , GSTm are connected to the same ground selection line GSL. In other example embodiments, the ground selection transistors are connected to the respective ground selection lines.

In some example embodiments, as illustrated in FIGS. 23A, a boundary portion BND may include one gate line corresponding to the dummy word-line DWL that activates simultaneously the dummy memory cells DMC11, DMC12, . . . , DMC1m connected thereto.

In some example embodiments, as illustrated in FIGS. 23B, a boundary portion BND may include two gate lines corresponding to dummy word-lines DWL11 and DWL12. The dummy word-line DWL11 may be included in the first stack ST1 and the dummy word-line DWL12 may be included in the second stack ST2.

FIG. 24 is a cross-sectional view for describing an example embodiment of a boundary portion included in a memory block according to an example embodiment.

Referring to FIG. 24, a channel hole of each cell string STR may include a first sub channel hole 610 and a second sub channel hole 630. A channel hole may be referred to as a pillar. The first sub channel hole 610 may include a channel layer 611, an inner material 612 and an insulation layer 613. The second sub channel hole 630 may include a channel layer 631, an inner material 632 and an insulation layer 633. The channel layer 611 of the first channel hole 610 may be connected to the channel layer 631 of the second sub channel hole 630 through a P-type silicon pad SIP. The sub channel holes 610 and 630 may be formed using a stopper line GTL5 having an appropriate etch rate. For example, the stopper line GTL5 may be formed of polysilicon and the other gate lines GTL1~GTL4 and the GTL6~GTL8 may be formed of metal such as tungsten to implement the appropriate etch rate.

The above-described boundary portion BND may correspond to the stopper layer GTL5 that is used to form the plurality of sub channel holes. The cells in the stopper layer GTL5 may be improper for storing data, and the stopper layer may be used as the boundary portion BND to form the dummy memory cells. However, example embodiments of the disclosure are not limited to a boundary portion of one stopper layer. For example, the boundary portion may include two or more gate layers.

The dummy memory cells may be implemented with a cell type or transistor type. For example, in an embodiment, the cell type includes a floating gate as a flash memory cell and the transistor type does not include the floating gate.

Figure 25:
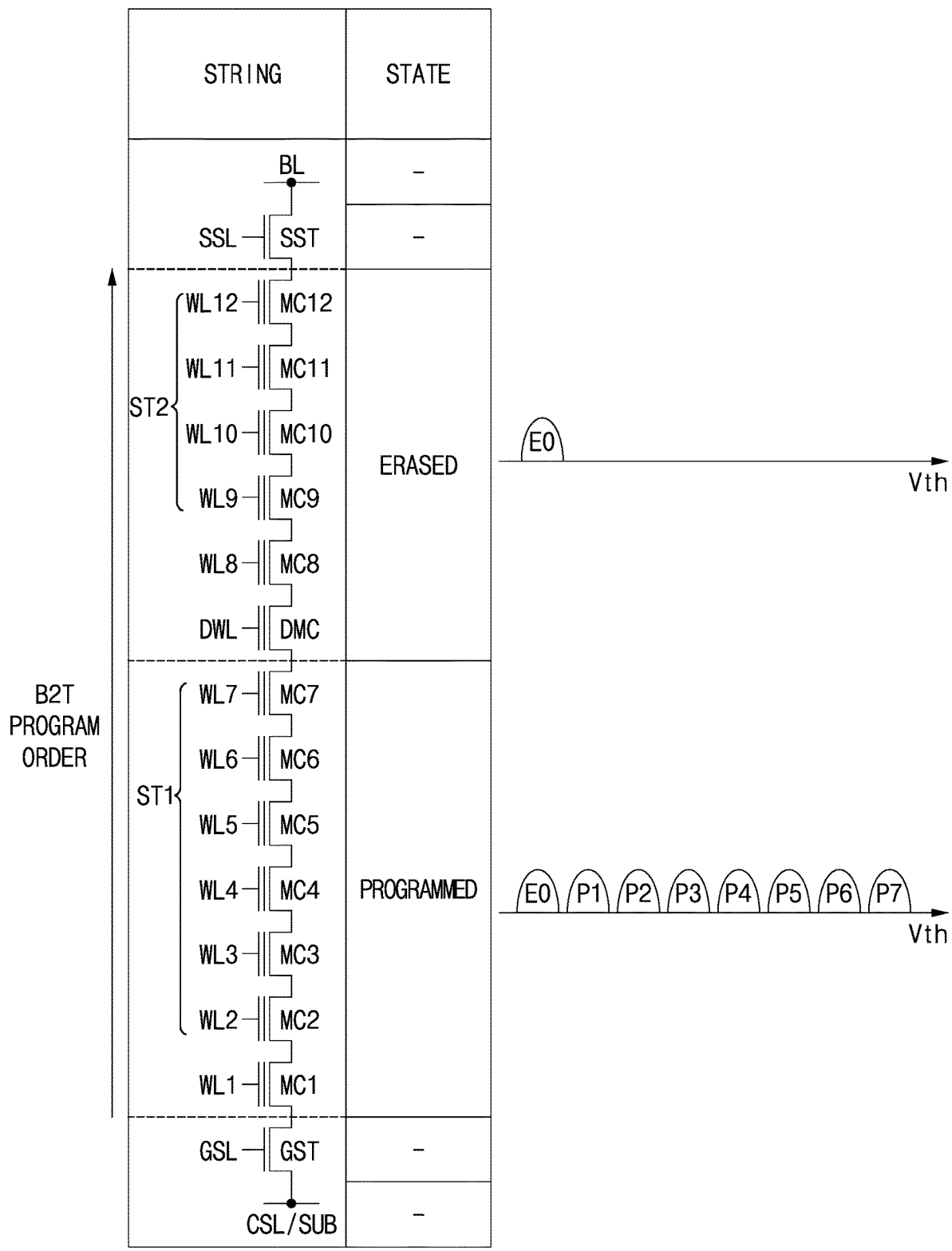
FIG. 25 is a diagram illustrating a program scenario according to an example embodiment.

FIG. 25 is a diagram illustrating a program scenario according to example embodiments.

FIG. 25 illustrates one cell string including a string selection transistor SST connected to a string selection line SSL, a ground selection transistor GST connected to a ground selection line GSL, memory cells MC1~MC12 connected to word-lines WL1~WL12 and a dummy memory cell DMC connected to the dummy word-line DWL and states of memory cells. The cell string is connected between a bit-line BL and a source line CSL coupled to the substrate SUB. FIG. 25 illustrates twelve memory cells and threshold voltage distributions Vth of a TLC storing three bits.

Referring to FIG. 25, according to a program scenario, the program operation may be performed in a upward direction from a lowermost word-line. In other words, as a size of the data stored in the memory block increases, the data may be filled in erased cells in the upward direction from bottom to top (B2T program order).

Each of the programmed memory cells MC1~MC7 of a selected stack ST1 may be in one of the erased state E0 and programmed states P1, P2, P3, P4, P5, P6 and P7 and not-programmed memory cells MC8~MC12 of an upper stack ST2 disposed at an upper position than the selected stack ST1 in the vertical direction VD are in an erased state E0.

Figure 26:
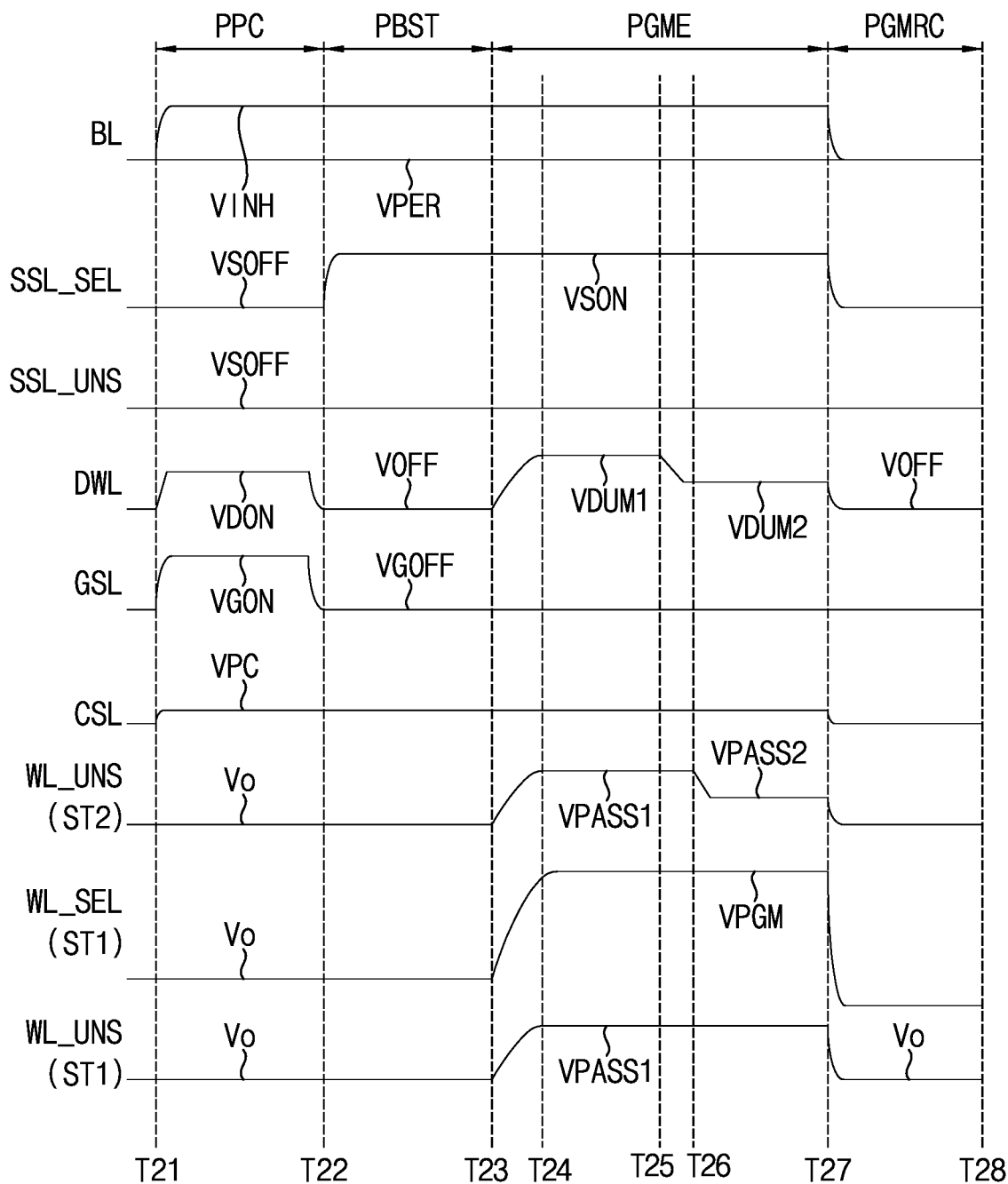
FIG. 26 is a timing diagram illustrating a program operation of a first stack according to the program scenario of FIG. 25.

FIG. 26 is a timing diagram illustrating a program operation of a first stack according to the program scenario of FIG. 25.

In FIG. 26, the first stack ST1 corresponds to a selected stack to be programmed and the second stack ST2 corresponds to an upper stack ST2 disposed at an upper position higher than the first stack ST1 (e.g., the selected stack) in the vertical direction VD.

Time interval T21~T22 is a precharge period PPC, time interval T22~T23 is a boosting period PBST, time interval T23~T27 is a program execution period PGME while a program voltage VPGM is applied to the selected word-line WL_SEL, and time interval T27~T28 is a program recovery period PGMRC. Hereinafter, a turn-on voltage and a turn-off voltage represent voltages of levels to turn on and off a corresponding transistor.

A program inhibition voltage VINH may be applied to the bit-line BL when it is a program inhibition bit-line and a program permission voltage VPER may be applied to bit-line BL when it is a program permission bit-line.

During the precharge period PPC, a turn-off voltage VSOFF is applied to a selected string selection line SSL_SEL and an unselected string selection line SSL_UNS, a turn-on voltage VDON is applied to a dummy word-line DWL and a turn-on voltage VGON is applied to a ground selection line GSL. The ground selection transistor and the dummy memory cells are turned on and thus a precharge voltage VPC of the source line CSL is applied to the channels CH of the first stack ST1 and the second stack ST2.

As such, the precharge voltage VPC may be applied to the channels of the first stack ST1 and the second stack ST2 before performing the boosting operation of the boosting period PBST. During the precharge period PPC, an initialization voltage Vo may be applied to a selected word-line WL_SEL and unselected word-lines WL_UNS. The initialization voltage Vo may have a voltage level capable of turning on the erased memory cells.

During the boosting period PBST, a turn-on voltage VSON is applied to the selected string selection line SSL_SEL, a turn-off voltage VOFF is applied to the dummy word-line DWL and thus the first stack ST1 and the second stack ST2 are electrically disconnected from each other. While the dummy memory cells are turned off, word-lines WL_UNS (ST1) and WL_SEL (ST1) of the first stack ST1 corresponding to the selected stack maintain the initialization voltage Vo and word-lines WL_UNS (ST2) of the second stack maintain the initialization voltage Vo. The program inhibition voltage VINH or the program permission voltage VPER may be applied to the channel of the selected stack ST1 depending on the bit-line BL.

After the precharge period PPC, a turn-off voltage VGOFF is applied to the ground selection line GSL to electrically disconnect the cell strings from the source line CSL.

During the program execution period PGME, a program voltage VPGM is applied to the selected word-line WL_SEL (ST1) of the first stack ST1 and the memory cells connected to the bit-lines BL to which the program permission voltage VPER is applied may be programmed. A first pass voltage VPASS1 is applied to the unselected word-lines WL_UNS (ST1) of the first stack ST1 during the program execution period PGME.

During the program execution period PGME, a turn-on voltage VSON is applied to selected string selection line SSL_SEL and the turn-off voltage VSOFF is applied to the unselected string selection line SSL_UNS.

The program execution period PGME may include a first sub period between time points T23 and T24, a second sub period between time point T24 and T25, a third sub period between time points T25 and T26 and a fourth sub period between time point T26 and T27.

During the first sub period T23~T24, the program voltage VPGM and the first pass voltage VPASS1 are ramping, the control circuit 450 in FIG. 9 may discriminate set-up timing of target bit-line coupled to selected cell strings based on target states of the program data during the first sub period T23~T24.

During the second sub period T24~T25, a first dummy voltage VDUM1 is applied to the dummy word-line DWL of the second stack ST2. During the third sub period T25~T26, the first dummy voltage VDUM1 is reduced to a second dummy voltage VDUM2.

During the second sub period T24~T25 and the third sub period T25~T26, the first pass voltage VPASS1 is applied to the word-lines WL_UNS (ST2) of the second stack ST2.

During the fourth sub period T26~T27, the second dummy voltage VDUM2 is applied to the dummy word-line DWL of the upper stack ST2. During the fourth sub period T26~T27, a second pass voltage VPASS2 smaller than the first pass voltage VPASS1 is applied to the word-lines WL_UNS (ST2) of the second stack ST2.

During the program recovery period PGMRC, a voltage of the word-lines WL_SEL (ST1) and WL_UNS (ST1) of the first stack ST1 corresponding to the selected stack are recovered to the initialization voltage Vo while reducing voltages of the word-lines WL_UNS (ST2) of the second stack ST2 corresponding to the upper stack from the first pass voltage VPASS1 to the initialization voltage Vo.

Figure 27:
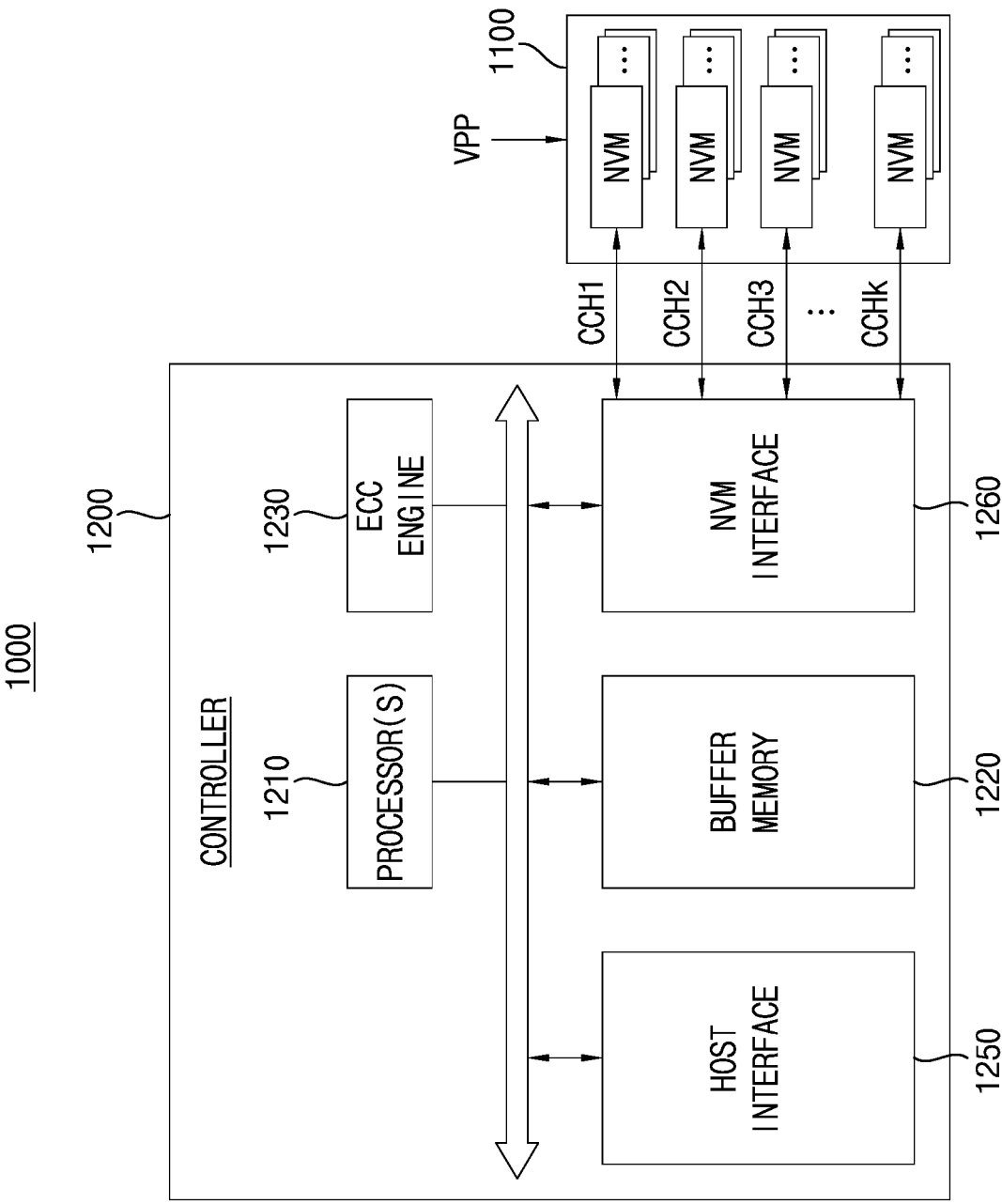
FIG. 27 is a block diagram illustrating a storage device that includes a nonvolatile memory device according to an example embodiment.

FIG. 27 is a block diagram illustrating a storage device that includes a nonvolatile memory device according to an example embodiment.

Referring to FIG. 27 a storage device 1000 includes a plurality of nonvolatile memory devices NVMs 1100 and a controller 1200. For example, the storage device 1000 maybe any storage device such as an embedded multimedia card (eMMC), a universal flash storage (UFS), a solid state disk or solid state drive (SSD), etc.

The controller 1200 maybe connected to the nonvolatile memory devices 1100 via a plurality of channels CCH1, CCH2, CCH3, . . . , CCHk. The controller 1200 may include one or more processors 1210, a buffer memory 1220, an error correction code (ECC) engine 1230, a host interface 1250 and a nonvolatile memory (NVM) interface 1260.

The buffer memory 1220 may store data used to drive the controller 1200. The ECC engine 1230 may calculate error correction code values of data to be programmed during a program operation, and may correct an error of read data using an error correction code value during a read operation. In a data recovery operation, the ECC engine 1230 may correct an error of data recovered from the nonvolatile memory devices 1100. The host interface 1250 may provide an interface with an external device. The nonvolatile memory interface 1260 may provide an interface with the nonvolatile memory devices 1100.

Each of the nonvolatile memory devices 1100 may correspond to the nonvolatile memory device according to example embodiments, and may be optionally supplied with an external high voltage VPP.

Figure 28:
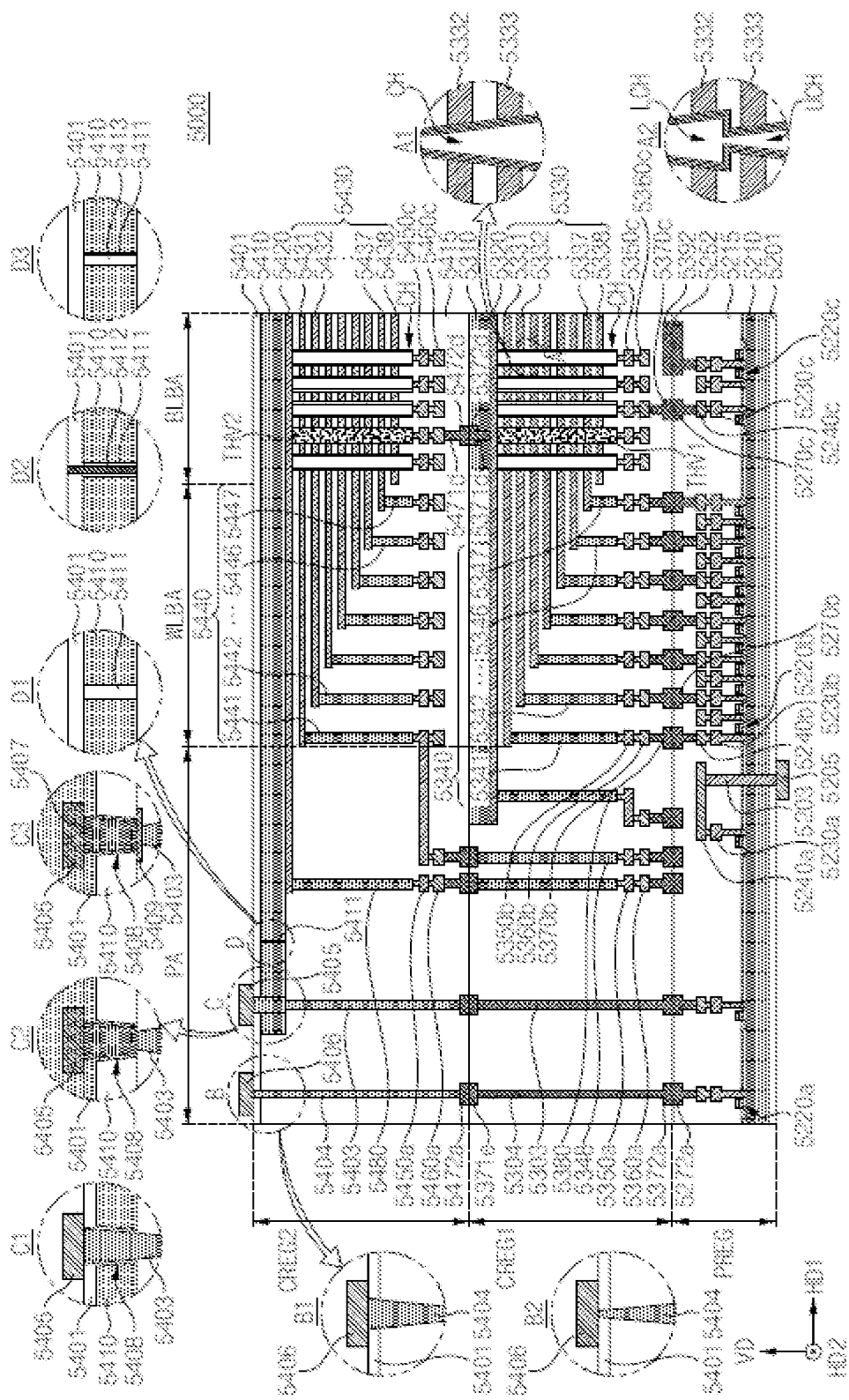
FIG. 28 is a cross-sectional view of a nonvolatile memory device according to an example embodiment.

FIG. 28 is a cross-sectional view of a nonvolatile memory device according to an example embodiment.

Referring to FIG. 28, a nonvolatile memory device (or a memory device) 5000 may have a chip-to-chip (C2C) structure. At least one upper chip including a cell region and a lower chip including a peripheral circuit region PREG may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W).

The memory device 5000 may include the at least one upper chip including the cell region. For example, as illustrated in FIG. 28, the memory device 5000 may include two upper chips. However, the number of the upper chips is not limited thereto. In the case in which the memory device 5000 includes the two upper chips, a first upper chip including a first cell region CREG1, a second upper chip including a second cell region CREG2 and the lower chip including the peripheral circuit region PREG may be manufactured separately, and then, the first upper chip, the second upper chip and the lower chip may be connected to each other by the bonding method to manufacture the memory device 5000. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on + third direction VD, and the upper portion of each of the first and second upper chips may mean an upper portion defined based on − third direction VD in FIG. 28. However, embodiments of the present disclosures are not limited thereto. In certain embodiments, one of the first upper chip and the second upper chip may be turned over and then may be connected to a corresponding chip by the bonding method.

Each of the peripheral circuit region PREG and the first and second cell regions CREG1 and CREG2 of the memory device 5000 may include an external pad bonding region PA, a word-line bonding region WLBA, and a bit-line bonding region BLBA.

The peripheral circuit region PREG may include a first substrate 5210 and a plurality of circuit elements 5220a, 5220b and 5220c formed on the first substrate 5210. An interlayer insulating layer 5215 including one or more insulating layers may be provided on the plurality of circuit elements 5220a, 5220b and 5220c, and a plurality of metal lines electrically connected to the plurality of circuit elements 5220a, 5220b and 5220c may be provided in the interlayer insulating layer 5215. For example, the plurality of metal lines may include first metal lines 5230a, 5230b and 5230c connected to the plurality of circuit elements 5220a, 5220b and 5220c, and second metal lines 5240a, 5240b and 5240c formed on the first metal lines 5230a, 5230b and 5230c. The plurality of metal lines may be formed of at least one of various conductive materials. For example, the first metal lines 5230a, 5230b and 5230c may be formed of tungsten having a relatively high electrical resistivity, and the second metal lines 5240a, 5240b and 5240c may be formed of copper having a relatively low electrical resistivity.

The first metal lines 5230a, 5230b and 5230c and the second metal lines 5240a, 5240b and 5240c are illustrated and described in the present embodiments. However, embodiments of the present disclosures are not limited thereto. In certain embodiments, at least one or more additional metal lines may further be formed on the second metal lines 5240a, 5240b and 5240c. In this case, the second metal lines 5240a, 5240b and 5240c may be formed of aluminum, and at least some of the additional metal lines formed on the second metal lines 5240a, 5240b and 5240c may be formed of copper having an electrical resistivity lower than that of aluminum of the second metal lines 5240a, 5240b and 5240c.

The interlayer insulating layer 5215 maybe disposed on the first substrate 5210 and may include an insulating material such as silicon oxide and/or silicon nitride.

Each of the first and second cell regions CREG1 and CREG2 may include at least one memory block. The first cell region CREG1 may include a second substrate 5310 and a common source line 5320. A plurality of word-lines 5330 (5331 to 5338) may be stacked on the second substrate 5310 in the third direction VD perpendicular to a top surface of the second substrate 5310. String selection lines and a ground selection line may be disposed on and under the word-lines 5330, and the plurality of word-lines 5330 maybe disposed between the string selection lines and the ground selection line. Likewise, the second cell region CREG2 may include a third substrate 5410 and a common source line 5420, and a plurality of word-lines 5430 (5431 to 5438) may be stacked on the third substrate 5410 in a direction (i.e., the Z-axis direction) perpendicular to a top surface of the third substrate 5410. Each of the second substrate 5310 and the third substrate 5410 maybe formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CREG1 and CREG2.

In some embodiments, as illustrated in a region 'A1', the channel structure CH may be provided in the bit-line bonding region BLBA and may extend in the direction perpendicular to the top surface of the second substrate 5310 to penetrate the word-lines 5330, the string selection lines, and the ground selection line. The channel structure CH may include a data storage layer, a channel layer, and a filling insulation layer. The channel layer may be electrically connected to a first metal line 5350c and a second metal line 5360c in the bit-line bonding region BLBA. For example, the second metal line 5360c may be a bit-line and may be connected to the channel structure CH through the first metal line 5350c. The bit-line 5360c may extend in a second direction HD2 parallel to the top surface of the second substrate 5310.

In some embodiments, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 5310 to penetrate the common source line 5320 and lower word-lines 5331 and 5332. The lower channel LCH may include a data storage layer, a channel layer, and a filling insulation layer and may be connected to the upper channel UCH. The upper channel UCH may penetrate upper word-lines 5333 to 5338. The upper channel UCH may include a data storage layer, a channel layer, and a filling insulation layer, and the channel layer of the upper channel UCH may be electrically connected to the first metal line 5350c and the second metal line 5360c. As a length of a channel increases, due to characteristics of manufacturing processes, it may be difficult to form a channel having a substantially uniform width. The memory device 5000 according to the present embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word-line located near to a boundary between the lower channel LCH and the upper channel UCH may be a dummy word-line. For example, the word-lines 5332 and 5333 adjacent to the boundary between the lower channel LCH and the upper channel UCH may be the dummy word-lines. In this case, data is not stored in memory cells connected to the dummy word-line. Alternatively, the number of pages corresponding to the memory cells connected to the dummy word-line may be less than the number of pages corresponding to the memory cells connected to a general word-line. A level of a voltage applied to the dummy word-line may be different from a level of a voltage applied to the general word-line, and thus it is possible to reduce an influence of a non-uniform channel width between the lower and upper channels LCH and UCH on an operation of the memory device.

Meanwhile, the number of the lower word-lines 5331 and 5332 penetrated by the lower channel LCH is less than the number of the upper word-lines 5333 to 5338 penetrated by the upper channel UCH in the region 'A2'. However, embodiments of the present disclosures are not limited thereto. In certain embodiments, the number of the lower word-lines penetrated by the lower channel LCH may be equal to or more than the number of the upper word-lines penetrated by the upper channel UCH. In addition, structural features and connection relation of the channel structure CH disposed in the second cell region CREG2 may be substantially the same as those of the channel structure CH disposed in the first cell region CREG1.

In the bit-line bonding region BLBA, a first through-electrode THV1 may be provided in the first cell region CREG1, and a second through-electrode THV2 may be provided in the second cell region CREG2. As illustrated in FIG. 28, the first through-electrode THV1 may penetrate the common source line 5320 and the plurality of word-lines 5330. In certain embodiments, the first through-electrode THV1 may further penetrate the second substrate 5310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In some embodiments, the first through-electrode THV1 and the second through-electrode THV2 may be electrically connected to each other through a first through-metal pattern 5372d and a second through-metal pattern 5472d. The first through-metal pattern 5372d may be formed at a bottom end of the first upper chip including the first cell region CREG1, and the second through-metal pattern 5472d may be formed at a top end of the second upper chip including the second cell region CREG2. The first through-electrode THV1 may be electrically connected to the first metal line 5350c and the second metal line 5360c. A lower via 5371d may be formed between the first through-electrode THV1 and the first through-metal pattern 5372d, and an upper via 5471d may be formed between the second through-electrode THV2 and the second through-metal pattern 5472d. The first through-metal pattern 5372d and the second through-metal pattern 5472d may be connected to each other by the bonding method.

In addition, in the bit-line bonding region BLBA, an upper metal pattern 5252 maybe formed in an uppermost metal layer of the peripheral circuit region PERI, and an upper metal pattern 5392 having the same shape as the upper metal pattern 5252 maybe formed in an uppermost metal layer of the first cell region CREG1. The upper metal pattern 5392 of the first cell region CREG1 and the upper metal pattern 5252 of the peripheral circuit region PREG may be electrically connected to each other by the bonding method. In the bit-line bonding region BLBA, the bit-line 5360c may be electrically connected to a page buffer included in the peripheral circuit region PERI. For example, some of the circuit elements 5220c of the peripheral circuit region PREG may constitute the page buffer, and the bit-line 5360c may be electrically connected to the circuit elements 5220c constituting the page buffer through an upper bonding metal pattern 5370c of the first cell region CREG1 and an upper bonding metal pattern 5270c of the peripheral circuit region PERI.

Referring continuously to FIG. 29, in the word-line bonding region WLBA, the word-lines 5330 of the first cell region CREG1 may extend in a first direction HD1 parallel to the top surface of the second substrate 5310 and may be connected to a plurality of cell contact plugs 5340 (5341 to 5347). First metal lines 5350b and second metal lines 5360b maybe be sequentially connected onto the cell contact plugs 5340 connected to the word-lines 5330. In the word-line bonding region WLBA, the cell contact plugs 5340 maybe connected to the peripheral circuit region PREG through upper bonding metal patterns 5370b of the first cell region CREG1 and upper bonding metal patterns 5270b of the peripheral circuit region PERI.

The cell contact plugs 5340 maybe electrically connected to a row decoder included in the peripheral circuit region PERI. For example, some of the circuit elements 5220b of the peripheral circuit region PREG may constitute the row decoder, and the cell contact plugs 5340 maybe electrically connected to the circuit elements 5220b constituting the row decoder through the upper bonding metal patterns 5370b of the first cell region CREG1 and the upper bonding metal patterns 5270b of the peripheral circuit region PERI. In some embodiments, an operating voltage of the circuit elements 5220b constituting the row decoder may be different from an operating voltage of the circuit elements 5220c constituting the page buffer. For example, the operating voltage of the circuit elements 5220c constituting the page buffer may be greater than the operating voltage of the circuit elements 5220b constituting the row decoder.

Likewise, in the word-line bonding region WLBA, the word-lines 5430 of the second cell region CREG2 may extend in the first direction HD1 parallel to the top surface of the third substrate 5410 and may be connected to a plurality of cell contact plugs 5440 (5441 to 5447). The cell contact plugs 5440 maybe connected to the peripheral circuit region PREG through an upper metal pattern of the second cell region CREG2 and lower and upper metal patterns and a cell contact plug 5348 of the first cell region CREG1.

In the word-line bonding region WLBA, the upper bonding metal patterns 5370b may be formed in the first cell region CREG1, and the upper bonding metal patterns 5270b may be formed in the peripheral circuit region PERI. The upper bonding metal patterns 5370b of the first cell region CREG1 and the upper bonding metal patterns 5270b of the peripheral circuit region PREG may be electrically connected to each other by the bonding method. The upper bonding metal patterns 5370b and the upper bonding metal patterns 5270b may be formed of aluminum, copper, or tungsten.

In the external pad bonding region PA, a lower metal pattern 5371e may be formed in a lower portion of the first cell region CREG1, and an upper metal pattern 5472a may be formed in an upper portion of the second cell region CREG2. The lower metal pattern 5371e of the first cell region CREG1 and the upper metal pattern 5472a of the second cell region CREG2 may be connected to each other by the bonding method in the external pad bonding region PA. Likewise, an upper metal pattern 5372a may be formed in an upper portion of the first cell region CREG1, and an upper metal pattern 5272a may be formed in an upper portion of the peripheral circuit region PERI. The upper metal pattern 5372a of the first cell region CREG1 and the upper metal pattern 5272a of the peripheral circuit region PREG may be connected to each other by the bonding method.

Common source line contact plugs 5380 and 5480 maybe disposed in the external pad bonding region PA. The common source line contact plugs 5380 and 5480 maybe formed of a conductive material such as a metal, a metal compound, and/or doped polysilicon. The common source line contact plug 5380 of the first cell region CREG1 may be electrically connected to the common source line 5320, and the common source line contact plug 5480 of the second cell region CREG2 may be electrically connected to the common source line 5420. A first metal line 5350a and a second metal line 5360a may be sequentially stacked on the common source line contact plug 5380 of the first cell region CREG1, and a first metal line 5450a and a second metal line 5460a may be sequentially stacked on the common source line contact plug 5480 of the second cell region CREG2.

Input/output pads 5205, 5405 and 5406 maybe disposed in the external pad bonding region PA. Referring to FIG. 28, a lower insulating layer 5201 may cover a bottom surface of the first substrate 5210, and a first input/output pad 5205 maybe formed on the lower insulating layer 5201. The first input/output pad 5205 maybe connected to at least one of a plurality of the circuit elements 5220a disposed in the peripheral circuit region PREG through a first input/output contact plug 5203 and may be separated from the first substrate 5210 by the lower insulating layer 5201. In addition, a side insulating layer may be disposed between the first input/output contact plug 5203 and the first substrate 5210 to electrically isolate the first input/output contact plug 5203 from the first substrate 5210.

An upper insulating layer 5401 covering a top surface of the third substrate 5410 maybe formed on the third substrate

5410. A second input/output pad 5405 and/or a third input/output pad 5406 maybe disposed on the upper insulating layer 5401. The second input/output pad 5405 maybe connected to at least one of the plurality of circuit elements 5220*a* disposed in the peripheral circuit region PREG through second input/output contact plugs 5403 and 5303, and the third input/output pad 5406 maybe connected to at least one of the plurality of circuit elements 5220*a* disposed in the peripheral circuit region PREG through third input/output contact plugs 5404 and 5304.

In some embodiments, the third substrate 5410 is not disposed in a region in which the input/output contact plug is disposed. For example, as illustrated in a region 'B', the third input/output contact plug 5404 maybe separated from the third substrate 5410 in a direction parallel to the top surface of the third substrate 5410 and may penetrate an interlayer insulating layer 5415 of the second cell region CREG2 so as to be connected to the third input/output pad 5406. In this case, the third input/output contact plug 5404 maybe formed by at least one of various processes.

In some embodiments, as illustrated in a region 'B1', the third input/output contact plug 5404 may extend in the third direction VD, and a diameter of the third input/output contact plug 5404 may become progressively greater toward the upper insulating layer 5401. In other words, a diameter of the channel structure CH described in the region 'A1' may become progressively less toward the upper insulating layer 5401, but the diameter of the third input/output contact plug 5404 may become progressively greater toward the upper insulating layer 5401. For example, the third input/output contact plug 5404 maybe formed after the second cell region CREG2 and the first cell region CREG1 are bonded to each other by the bonding method.

In certain embodiments, as illustrated in a region 'B2', the third input/output contact plug 5404 may extend in the third direction VD, and a diameter of the third input/output contact plug 5404 may become progressively less toward the upper insulating layer 5401. In other words, like the channel structure CH, the diameter of the third input/output contact plug 5404 may become progressively less toward the upper insulating layer 5401. For example, the third input/output contact plug 5404 maybe formed together with the cell contact plugs 5440 before the second cell region CREG2 and the first cell region CREG1 are bonded to each other.

In certain embodiments, the input/output contact plug may overlap with the third substrate 5410. For example, as illustrated in a region 'C', the second input/output contact plug 5403 may penetrate the interlayer insulating layer 5415 of the second cell region CREG2 in the third direction VD and may be electrically connected to the second input/output pad 5405 through the third substrate 5410. In this case, a connection structure of the second input/output contact plug 5403 and the second input/output pad 5405 maybe realized by various methods.

In some embodiments, as illustrated in a region 'C1', an opening 5408 maybe formed to penetrate the third substrate 5410, and the second input/output contact plug 5403 maybe connected directly to the second input/output pad 5405 through the opening 5408 formed in the third substrate 5410. In this case, as illustrated in the region 'C1', a diameter of the second input/output contact plug 5403 may become progressively greater toward the second input/output pad 5405. However, embodiments of the present disclosures are not limited thereto, and in certain embodiments, the diameter of the second input/output contact plug 5403 may become progressively less toward the second input/output pad 5405.

In certain embodiments, as illustrated in a region 'C2', the opening 5408 penetrating the third substrate 5410 maybe formed, and a contact 5407 maybe formed in the opening 5408. An end of the contact 5407 maybe connected to the second input/output pad 5405, and another end of the contact 5407 maybe connected to the second input/output contact plug 5403. Thus, the second input/output contact plug 5403 maybe electrically connected to the second input/output pad 5405 through the contact 5407 in the opening 5408. In this case, as illustrated in the region 'C2', a diameter of the contact 5407 may become progressively greater toward the second input/output pad 5405, and a diameter of the second input/output contact plug 5403 may become progressively less toward the second input/output pad 5405. For example, the second input/output contact plug 5403 maybe formed together with the cell contact plugs 5440 before the second cell region CREG2 and the first cell region CREG1 are bonded to each other, and the contact 5407 maybe formed after the second cell region CREG2 and the first cell region CREG1 are bonded to each other.

In certain embodiments illustrated in a region 'C3', a stopper 5409 may further be formed on a bottom end of the opening 5408 of the third substrate 5410, as compared with the embodiments of the region 'C2'. The stopper 5409 maybe a metal line formed in the same layer as the common source line 5420. Alternatively, the stopper 5409 maybe a metal line formed in the same layer as at least one of the word-lines 5430. The second input/output contact plug 5403 may be electrically connected to the second input/output pad 5405 through the contact 5407 and the stopper 5409.

Like the second and third input/output contact plugs 5403 and 5404 of the second cell region CREG2, a diameter of each of the second and third input/output contact plugs 5303 and 5304 of the first cell region CREG1 may become progressively less toward the lower metal pattern 5371*e* or may become progressively greater toward the lower metal pattern 5371*e*.

Meanwhile, in some embodiments, a slit 5411 maybe formed in the third substrate 5410. For example, the slit 5411 maybe formed at a certain position of the external pad bonding region PA. For example, as illustrated in a region 'D', the slit 5411 maybe located between the second input/output pad 5405 and the cell contact plugs 5440 when viewed in a plan view. Alternatively, the second input/output pad 5405 maybe located between the slit 5411 and the cell contact plugs 5440 when viewed in a plan view.

In some embodiments, as illustrated in a region 'D1', the slit 5411 maybe formed to penetrate the third substrate 5410. For example, the slit 5411 maybe used to prevent the third substrate 5410 from being finely cracked when the opening 5408 is formed. However, embodiments of the present disclosures are not limited thereto, and in certain embodiments, the slit 5411 maybe formed to have a depth ranging from about 60% to about 70% of a thickness of the third substrate 5410.

In certain embodiments, as illustrated in a region 'D2', a conductive material 5412 maybe formed in the slit 5411. For example, the conductive material 5412 maybe used to discharge a leakage current occurring in driving of the circuit elements in the external pad bonding region PA to the outside. In this case, the conductive material 5412 maybe connected to an external ground line.

In certain embodiments, as illustrated in a region 'D3', an insulating material 5413 may be formed in the slit 5411. For example, the insulating material 5413 maybe used to electrically isolate the second input/output pad 5405 and the second input/output contact plug 5403 disposed in the external pad bonding region PA from the word-line bonding region WLBA. Since the insulating material 5413 is formed in the slit 5411, it is possible to prevent a voltage provided through the second input/output pad 5405 from affecting a metal layer disposed on the third substrate 5410 in the word-line bonding region WLBA.

Meanwhile, in certain embodiments, the first to third input/output pads 5205, 5405 and 5406 maybe selectively formed. For example, the memory device 5000 maybe realized to include only the first input/output pad 5205 disposed on the first substrate 5210, to include only the second input/output pad 5405 disposed on the third substrate 5410, or to include only the third input/output pad 5406 disposed on the upper insulating layer 5401.

In some embodiments, at least one of the second substrate 5310 of the first cell region CREG1 or the third substrate 5410 of the second cell region CREG2 may be used as a sacrificial substrate and may be completely or partially removed before or after a bonding process. An additional layer may be stacked after the removal of the substrate. For example, the second substrate 5310 of the first cell region CREG1 may be removed before or after the bonding process of the peripheral circuit region PREG and the first cell region CREG1, and then, an insulating layer covering a top surface of the common source line 5320 or a conductive layer for connection may be formed. Likewise, the third substrate 5410 of the second cell region CREG2 may be removed before or after the bonding process of the first cell region CREG1 and the second cell region CREG2, and then, the upper insulating layer 5401 covering a top surface of the common source line 5420 or a conductive layer for connection may be formed.

FIG. 29 is a diagram illustrating a manufacturing process of a stacked semiconductor device according to an example embodiment.

Referring to FIG. 29, respective integrated circuits may be formed on a first wafer WF1 and a second wafer WF2. The memory cell array may be formed in the first wafer WF1, and the peripheral circuits may be formed in the second wafer WF2.

After the various integrated circuits have been respectively formed on the first and second wafers WF1 and WF2, the first wafer WF1 and the second wafer WF2 may be bonded together. The bonded wafers WF1 and WF2 may then be cut (or divided) into separate chips, in which each chip corresponds to a semiconductor device such as, for example, the memory device 6000, including a first semiconductor die SD1 and a second semiconductor die SD2 that are stacked vertically (e.g., the first semiconductor die SD1 is stacked on the second semiconductor die SD2, etc.). Each cut portion of the first wafer WF1 corresponds to the first semiconductor die SD1, and each cut portion of the second wafer WF2 corresponds to the second semiconductor die SD2. For example, the memory device 5000 of FIG. 28 maybe manufactured based on the manufacturing process of FIG. 29.

Figure 30:
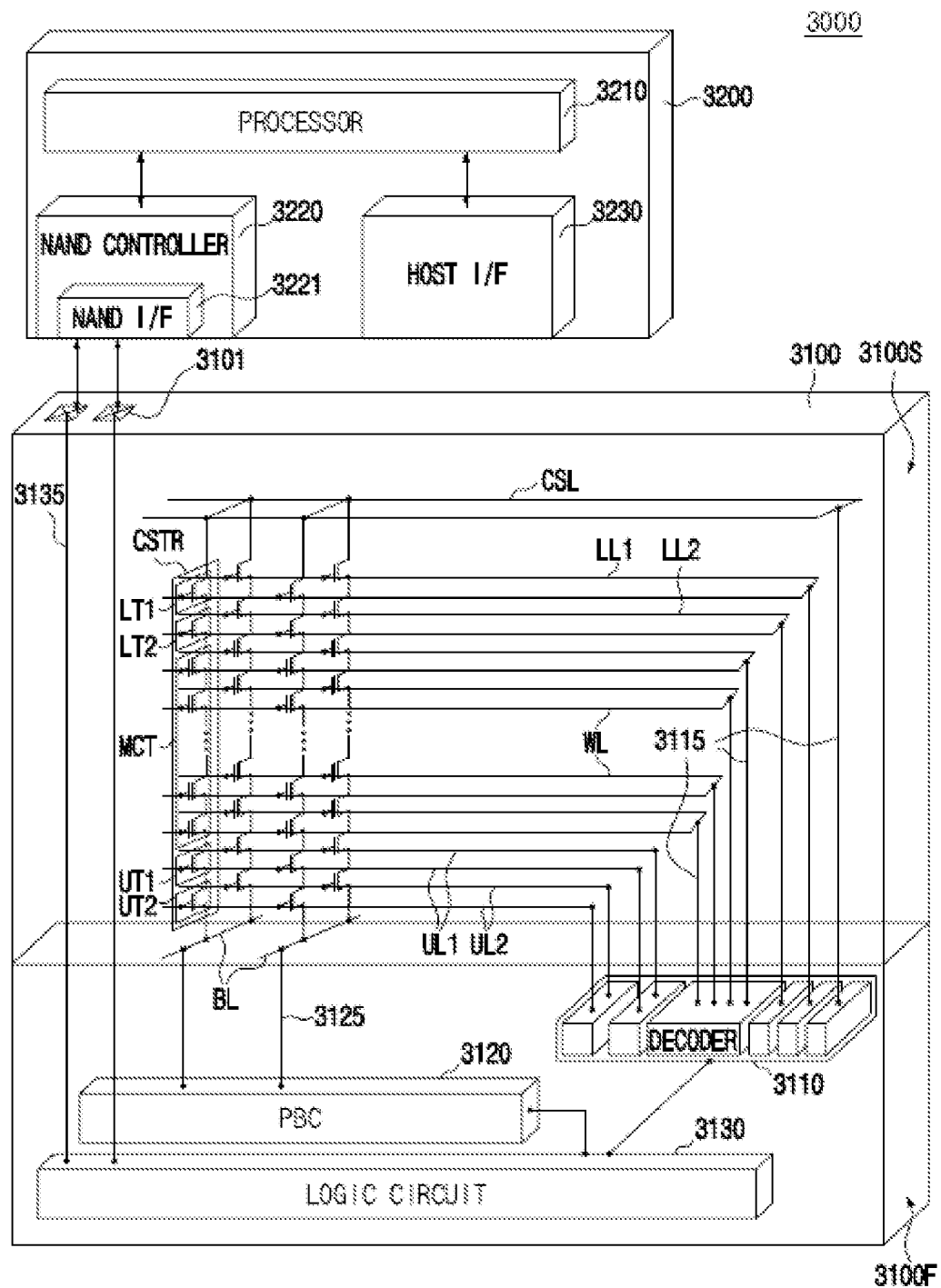
FIG. 30 is a block diagram illustrating an electronic system including a semiconductor device according to an example embodiment.

FIG. 30 is a block diagram illustrating an electronic system including a semiconductor device according to example embodiments.

Referring to FIG. 30, an electronic system 3000 may include a semiconductor device 3100 and a controller 3200 electrically connected to the semiconductor device 3100. The electronic system 3000 maybe a storage device including one or a plurality of semiconductor devices 3100 or an electronic device including a storage device. For example, the electronic system 3000 maybe a solid state drive (SSD) device, a universal serial bus (USB), a computing system, a medical device, or a communication device that may include one or a plurality of semiconductor devices 3100.

The semiconductor device 3100 maybe a non-volatile memory device, for example, a NAND flash memory device that will be illustrated with reference to FIGS. 8 to 26, and may perform the first program operation and the second program operation described with reference to FIGS. 1 through 7. The semiconductor device 3100 may include a first structure 3100F and a second structure 3100S on the first structure 3100F. The first structure 3100F may be a peripheral circuit structure including a decoder circuit 3110, a page buffer circuit 3120, and a logic circuit 3130. The second structure 3100S may be a memory cell structure including a bit-line BL, a common source line CSL, word-lines WL, first and second upper gate lines UL1 and UL2, first and second lower gate lines LL1 and LL2, and memory cell strings CSTR between the bit line BL and the common source line CSL.

In the second structure 3100S, each of the memory cell strings CSTR may include lower transistors LT1 and LT2 adjacent to the common source line CSL, upper transistors UT1 and UT2 adjacent to the bit-line BL, and a plurality of memory cell transistors MCT between the lower transistors LT1 and LT2 and the upper transistors UT1 and UT2. The number of the lower transistors LT1 and LT2 and the number of the upper transistors UT1 and UT2 may be varied in accordance with example embodiments.

In example embodiments, the upper transistors UT1 and UT2 may include string selection transistors, and the lower transistors LT1 and LT2 may include ground selection transistors. The lower gate lines LL1 and LL2 may be gate electrodes of the lower transistors LT1 and LT2, respectively. The word lines WL may be gate electrodes of the memory cell transistors MCT, respectively, and the upper gate lines UL1 and UL2 may be gate electrodes of the upper transistors UT1 and UT2, respectively.

In example embodiments, the lower transistors LT1 and LT2 may include a lower erase control transistor LT1 and a ground selection transistor LT2 that may be connected with each other in serial. The upper transistors UT1 and UT2 may include a string selection transistor UT1 and an upper erase control transistor UT2. At least one of the lower erase control transistor LT1 and the upper erase control transistor UT2 may be used in an erase operation for erasing data stored in the memory cell transistors MCT through gate induced drain leakage (GIDL) phenomenon.

The common source line CSL, the first and second lower gate lines LL1 and LL2, the word lines WL, and the first and second upper gate lines UL1 and UL2 may be electrically connected to the decoder circuit 3110 through first connection wirings 1115 extending to the second structure 3110S in the first structure 3100F. The bit-lines BL may be electrically connected to the page buffer circuit 3120 through second connection wirings 3125 extending to the second structure 3100S in the first structure 3100F.

In the first structure 3100F, the decoder circuit 3110 and the page buffer circuit 3120 may perform a control operation for at least one selected memory cell transistor among the plurality of memory cell transistors MCT. The decoder circuit 3110 and the page buffer circuit 3120 maybe controlled by the logic circuit 3130. The semiconductor device 3100 may communicate with the controller 3200 through an input/output pad 3101 electrically connected to the logic circuit 3130. The input/output pad 3101 maybe electrically connected to the logic circuit 3130 through an input/output connection wiring 3135 extending to the second structure 3100S in the first structure 3100F.

The controller 3200 may include a processor 3210, a NAND controller 3220, and a host interface 3230. The electronic system 3000 may include a plurality of semiconductor devices 3100, and in this case, the controller 3200 may control the plurality of semiconductor devices 3100.

The processor 3210 may control operations of the electronic system 3000 including the controller 3200. The processor 3210 maybe operated by firmware, and may control the NAND controller 3220 to access the semiconductor device 3100. The NAND controller 3220 may include a NAND interface 3221 for communicating with the semiconductor device 3100. Through the NAND interface 3221, a control command for controlling the semiconductor device 3100, data to be written in the memory cell transistors MCT of the semiconductor device 3100, data to be read from the memory cell transistors MCT of the semiconductor device 3100, etc., may be transferred. The host interface 3230 may provide communication between the electronic system 3000 and an outside host. When the control command is received from the outside host through the host interface 3230, the processor 3210 may control the semiconductor device 3100 in response to the control command.

A nonvolatile memory device or a storage device according to an example embodiment may be packaged using various package types or package configurations.

The present disclosure may be applied to various electronic devices and systems that include the nonvolatile memory devices and the memory packages. For example, the present disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

The foregoing is illustrative of example embodiments and is not to be construed as limiting thereof. Although a few example embodiments have been described, those skilled in the art will readily appreciate that many modifications are possible in the example embodiments without materially departing from the teachings of the present disclosure. Accordingly, all such modifications are intended to be included within the scope of the present disclosure.

What is claimed is:

1. A nonvolatile memory device comprising:
at least one memory block including a plurality of cell strings where each of the plurality of cell strings includes a string selection transistor, a plurality of memory cells and a ground selection transistor which are connected in series and disposed in a vertical direction between a bit-line and a common source line; and
a control circuit configured to control a first program operation by:
dividing program data having threshold voltage distributions which have a plurality of states into a plurality of groups;
discharging target bit-lines coupled to selected cell strings among the plurality of cell strings corresponding to the plurality of groups to a ground voltage, during a bit-line set-up period of a program loop;
discriminating a set-up timing of each of the target bit-lines based on target states of the plurality of groups during a first sub period of a program execution period of the program loop, in which a program voltage and a program pass voltage are ramping; and
applying the program voltage with a signal pulse having a second target level to a selected word-line of the plurality of cell strings, while applying the program pass voltage having a first target level to unselected word-lines of the plurality of cell strings, during a second sub period of the program execution period.

2. The nonvolatile memory device of claim 1, wherein the control circuit is configured to control the first program operation by:
applying a power supply voltage at a first time point, to at least one first bit-line among the target bit-lines coupled to at least one first cell string among the plurality of cell strings corresponding to a first group among the plurality of groups including a lower state among the plurality of states having a lowermost voltage distribution adjacent to an erased state from among the plurality of states; and
applying the power supply voltage, at a second time point after the first time point, to at least one second bit-line among the target bit-lines coupled to at least one second cell string among the plurality of cell strings corresponding to a second group among the plurality of groups including an intermediate state among the plurality of states between the lower state and an upper state among the plurality of states having an uppermost voltage distribution.

3. The nonvolatile memory device of claim 2, wherein the control circuit is configured to determine the first sub period and the second sub period based on a voltage level of the program pass voltage that is ramping in the first sub period.

4. The nonvolatile memory device of claim 2, wherein, in response to the applying of the power supply voltage, a first channel of the at least one first cell string is floated at the first time point, a second channel of the at least one second cell string is floated at the second time point, and the first and second channels receive the program pass voltage.

5. The nonvolatile memory device of claim 4, wherein, during the applying of the program voltage having the second target level to the selected word-line, the control circuit is configured to control the first program operation by:
applying each of a first effective program voltage, a second effective program voltage and a third effective program voltage to respective ones of memory cells corresponding to the first group, memory cells corresponding to the second group and memory cells corresponding to a third group including the upper state in parallel,
wherein a voltage level of the second effective program voltage is greater than a voltage level of the first effective program voltage, and
wherein a voltage level of the third effective program voltage is greater than the voltage level of the second effective program voltage.

6. The nonvolatile memory device of claim 1, wherein the control circuit is further configured to control the first program operation by:
precharging channels of the plurality of cell strings to a first voltage during the bit-line set-up period; and
recovering the voltages of the selected word-line and the unselected word-lines to a second voltage greater than the ground voltage during a program recovery period, the program recovery period successive to the program execution period.

7. The nonvolatile memory device of claim 6, wherein the control circuit is configured to control a second program operation by applying the program voltage having a third target level to the selected word-line such that threshold voltage distributions having one or more states in each of the plurality of groups are discriminated with respect to each other after the program recovery period.

8. The nonvolatile memory device of claim 1, wherein the control circuit is configured to adjust a number of the plurality of groups based on a number of the plurality of states.

9. The nonvolatile memory device of claim of 1, wherein the control circuit is configured to decrease a ramping slope of the program pass voltage in the first sub period based on a number of the plurality of groups increasing.

10. The nonvolatile memory device of claim of 1, wherein the control circuit is configured to adjust the set-up timing of each of the target bit-lines based on a distance of the selected word-line from the common source line.

11. The nonvolatile memory device of claim 1, further comprising:
  a voltage generator configured to generate word-line voltages including the program voltage and the program pass voltage based on a control signal;
  an address decoder configured to provide the word-line voltages to the at least one memory block based on a row address;
  a page buffer circuit coupled to the plurality of cell strings through a plurality of bit-lines among the target bit-lines; and
  a voltage level detector configured to generate a voltage level signal by detecting a voltage level of the program pass voltage, and
  wherein the control circuit is configured to control the voltage generator, the address decoder and the page buffer circuit based on a command and an address including the row address.

12. The nonvolatile memory device of claim 11,
  wherein the control circuit is configured to control the voltage generator and the address decoder to apply the program pass voltage to the unselected word-lines during the program execution period, and
  wherein the control circuit is configured to control the page buffer circuit to discriminate the set-up timing of each of the target bit-lines based on the voltage level signal.

13. The nonvolatile memory device of claim 11, wherein the control circuit is configured to control the voltage generator and the address decoder to:
  apply a first turn-on voltage to a string selection transistor and a ground selection transistor of each of the selected cell strings from a first time point in the bit-line set-up period to an ending time point of the bit-line set-up period; and
  apply the first turn-on voltage to a sting selection transistor and a ground selection transistor of an unselected cell string from among the plurality of cell strings from the first time point in the bit-line set-up period to a second time point in the bit-line set-up period.

14. The nonvolatile memory device of claim 11, wherein the control circuit is configured to control the voltage generator and the address decoder to:
  increase step-wisely the second target level of the program voltage applied to the selected word-line during the program execution period; and
  maintain the first target level of the program pass voltage applied to the unselected word-lines the program execution period.

15. The nonvolatile memory device of claim 1, wherein the plurality of cell strings are divided into a plurality of stacks disposed in the vertical direction,
  wherein each of the plurality of stacks includes at least one dummy word-line adjacent to a boundary between the plurality of stacks, and
  wherein the control circuit is further configured to control the first program operation by reducing a voltage level of a dummy voltage applied to the at least one dummy word-line of at least one upper stack from among the plurality of stacks during the program execution period, and
  wherein the at least one upper stack is disposed at a higher position than a selected stack in the vertical direction and the selected stack from among the plurality of stacks includes the selected word-line.

16. The nonvolatile memory device of claim 15, wherein the control circuit is further configured to control the first program operation by:
  applying a first dummy voltage to the at least one dummy word-line of the least one upper stack during the first sub period and the second sub-period;
  reduce the first dummy voltage to a second dummy voltage during a third sub period of the program execution period; and
  apply the second dummy voltage to the at least one dummy word-line of the least one upper stack during a fourth sub period of the program execution period.

17. A method of programming a nonvolatile memory device which includes at least one memory block including a plurality of cell strings where each of the plurality of cell strings includes a string selection transistor, a plurality of memory cells and a ground selection transistor which are connected in series and disposed in a vertical direction between a bit-line and a common source line, the method comprising:
  dividing program data having threshold voltage distributions which have a plurality of states into a plurality of groups;
  discharging target bit-lines coupled to selected cell strings among the plurality of cell strings corresponding to the plurality of groups to a ground voltage, during a bit-line set-up period of a program loop;
  discriminating a set-up timing of each of the target bit-lines based on target states of the plurality of groups during a first sub period of a program execution period of the program loop, in which a program voltage and a program pass voltage are ramping; and
  applying the program voltage with a signal pulse having a second target level to a selected word-line of the plurality of cell strings, while applying the program pass voltage having a first target level to unselected word-lines of the plurality of cell strings, during a second sub period of the program execution period.

18. The method of claim 17, wherein the discriminating the set-up timing of each of the target bit-lines comprises:
  applying a power supply voltage at a first time point, to at least one first bit-line among the target bit-lines coupled to at least one first cell string among the plurality of cell strings corresponding to a first group including a lower state among the plurality of states having a lowermost voltage distribution adjacent to an erased state from among the plurality of states; and applying the power supply voltage, at a second time point after the first time point, to at least one second bit-line among the target bit-lines coupled to at least one second cell string among the plurality of cell strings corresponding to a second group including an intermediate state among the plurality of states between the lower state and an upper state having an uppermost voltage distribution from among the plurality of states.

19. The method of claim 17, further comprising:
applying the program voltage having a third target level to the selected word-line such that threshold voltage distributions having one or more states in each of the plurality of groups are discriminated with respect to each other.

20. A nonvolatile memory device comprising:
at least one memory block including a plurality of cell strings where each of the plurality of cell strings includes a string selection transistor, a plurality of memory cells and a ground selection transistor which are connected in series and disposed in a vertical direction between a bit-line and a common source line;
a control circuit configured to control a program operation by:
dividing program data having threshold voltage distributions which have a plurality of states into a plurality of groups;
discharging target bit-lines coupled to selected cell strings among the plurality of cell strings corresponding to the plurality of groups to a ground voltage, during a bit-line set-up period of a program loop;
discriminating a set-up timing of each of the target bit-lines based on a voltage level signal and target states of the plurality of groups during a first sub period of a program execution period of the program loop, in which a program voltage and a program pass voltage are ramping; and
applying the program voltage with a signal pulse having a second target level to a selected word-line of the plurality of cell strings, while applying the program pass voltage having a first target level to unselected word-lines of the plurality of cell strings, during a second sub period of the program execution period; and
a voltage level detector configured to generate the voltage level signal by detecting a voltage level of the program pass voltage and configured to provide the voltage level signal to the control circuit.

* * * * *